United States Patent
Winther et al.

(10) Patent No.: US 11,691,636 B2
(45) Date of Patent: Jul. 4, 2023

(54) SYSTEMS AND METHODS FOR GENERATING A CONTEXT-DEPENDENT EXPERIENCE FOR A DRIVER

(71) Applicants: Volkswagen Aktiengesellschaft, Wolfsburg (DE); AUDI AG, Ingolstadt (DE); Porsche AG, Stuttgart (DE)

(72) Inventors: Morten Troestrup Winther, Menlo Park, CA (US); Josephine Clara Elisabeth Nitschke, Pacifica, CA (US); Joerg Christian Wolf, Belmont, CA (US)

(73) Assignee: AUDI AG, Ingolstadt (DE)

( * ) Notice: Subject to any disclaimer, the term of this patent is extended or adjusted under 35 U.S.C. 154(b) by 278 days.

(21) Appl. No.: 17/141,490

(22) Filed: Jan. 5, 2021

(65) Prior Publication Data
US 2022/0212679 A1    Jul. 7, 2022

(51) Int. Cl.
*B60W 50/00*    (2006.01)
*H04W 4/024*    (2018.01)
(Continued)

(52) U.S. Cl.
CPC ........ *B60W 50/0098* (2013.01); *B60W 50/16* (2013.01); *G01C 21/3484* (2013.01);
(Continued)

(58) Field of Classification Search
CPC ............ B60W 50/0098; B60W 50/16; B60W 2556/60; B60W 2420/54; B60W 2540/22;
(Continued)

(56) References Cited

U.S. PATENT DOCUMENTS

| 2013/0070043 A1 | 3/2013 | Geva et al. ................. 348/14.02 |
| 2015/0254955 A1 | 9/2015 | Fields et al. ...................... 705/4 |

(Continued)

FOREIGN PATENT DOCUMENTS

| DE | 102019132723 A1 | 6/2021 | ............. G01L 13/00 |
| WO | 2016/083122 A1 | 6/2016 | ............. B06W 40/06 |
| WO | 2020/118273 A9 | 8/2020 | ............. G06Q 50/10 |

OTHER PUBLICATIONS

International Search Report and Written, Opinion, Application No. PCT/EP2022/050056, 13 pages, dated Mar. 28, 2022.

*Primary Examiner* — Peter D Nolan
*Assistant Examiner* — Wae L Louie
(74) *Attorney, Agent, or Firm* — Slayden Grubert Beard PLLC

(57) ABSTRACT

A system is provided generating a context-dependent experience for a vehicle driver, e.g., to relax or enhance the driver's mental state. A system controller is configured to receive driving context data regarding a driving situation from various driving context data sources. The driving context data may include vehicle operation data, e.g., generated by vehicle-based sensors, and environmental data regarding an environment external to the vehicle, e.g., received wirelessly from a remote server. The system controller may identify content triggering events based on (a) the received driver context data and (b) a set of content triggering rules. For each content triggering event, the system controller may select one or more human-perceivable contents elements (e.g., audio clips, seat massage settings, or air conditioner settings), and control one or more content output devices (e.g., speakers, seat massage system, or vehicle HVAC system) to output the selected content element(s) to the driver.

23 Claims, 13 Drawing Sheets

(51) Int. Cl.
  *H04W 4/44* (2018.01)
  *B60W 50/16* (2020.01)
  *G01C 21/34* (2006.01)
  *G01S 19/01* (2010.01)
  *B60H 1/00* (2006.01)

(52) U.S. Cl.
  CPC ............ *G01S 19/01* (2013.01); *H04W 4/024* (2018.02); *H04W 4/44* (2018.02); *B60H 1/00742* (2013.01); *B60W 2420/54* (2013.01); *B60W 2540/22* (2013.01); *B60W 2556/60* (2020.02)

(58) Field of Classification Search
  CPC .... H04W 4/024; H04W 4/44; G01C 21/3484; G01S 19/01
  See application file for complete search history.

(56) References Cited

U.S. PATENT DOCUMENTS

| | | | |
|---|---|---|---|
| 2017/0355377 A1* | 12/2017 | Vijaya Kumar | B60W 50/0098 |
| 2018/0009442 A1 | 1/2018 | Spasojevic et al. | |
| 2018/0244288 A1* | 8/2018 | Glaser | B60W 50/14 |
| 2022/0212679 A1* | 7/2022 | Winther | H04W 4/024 |

\* cited by examiner

SYSTEMS AND METHODS FOR GENERATING A CONTEXT-DEPENDENT EXPERIENCE FOR A DRIVER

TECHNICAL FIELD

The present disclosure relates to vehicle-based systems and methods, and more particularly to systems and methods for generating a context-dependent experience for a driver of a vehicle, e.g., to relax or otherwise enhance the driver's mental state.

BACKGROUND

It is known that driving is stressful activity for many, if not most, people. Driving requires full concentration and a level of calm, so it is important for a driver to control or manage their stress levels, for the safety of the driver and others on the road. However, many factors can raise a driver's stress level, for example driving in heavy traffic, being stuck in traffic, stopped at a traffic light (sometimes for multiple cycles of the light), or driving at high speeds, e.g., highway driving. In addition, the stress of everyday life, such as work or personal problems, can further contribute to the driver's stress level. The negative effects of stress on a driver are well-known, including causing the driver to lose concentration or make unpredictable or aggressive maneuvers, for example.

One common technique for combating stress is meditation. The meditation industry is rapidly growing with mindfulness applications and new technologically smart products. However, such applications and products are typically not adapted for a vehicle driving context. Existing guided meditation applications often instruct the user to close their eyes, and are typically designing for use in static spaces (e.g., a living room or bedroom). In addition, conventional meditation guides typically involve the playback of continuous audio clips. This does not adapt well to the dynamics of driving a vehicle, where the driver must be aware of surroundings and remain focused while maneuvering and operating the vehicle.

At the other end of the spectrum, drivers can often become bored, or too relaxed, which can also lead to a loss of concentration or attention. For example, an unchallenging driving scenario with a lack of mental stimulation, e.g., driving alone on a rural highway, may cause the driver to lose focus or become sleepy, or look to their smartphone for entertainment or other engagement, leading to a very dangerous driving situation.

Thus, there is a need for systems and methods for generating a relaxing, focusing, or otherwise mentally enhancing experience for a driver, in particular for systems and methods that adjust to the current situational context.

SUMMARY

Systems and methods are provided for generating a context-dependent experience for a vehicle driver, e.g., to relax or otherwise enhance the driver's mental state. A system may include various data sources that generate or access driving context data regarding a driving situation, an output device that outputs human-perceivable content (e.g., speakers that play selected audio clips), and a system controller. The driving context data may include (a) vehicle operation data regarding the operation of the vehicle, e.g., generated by vehicle-based sensors, and (b) environmental data regarding an environment external to the vehicle, e.g., weather data, traffic data, or traffic light data. Such environmental data may be obtained at the vehicle from remote server(s) via wireless communication links. The system controller may be configured to collect the driving context data from the various data sources, and identify a content triggering event based on (a) the collected driver context data and (b) a set of content triggering rules. For example, the system controller may determine the vehicle is stopped at a red light for a particular amount of time (e.g., predicted based on known information). In response to identifying the content triggering event, the system controller may select a human-perceivable content element, and control the output device to output the selected content element to the driver. Content elements may be embodied as any type of human-perceivable content, e.g., audio output, displayed images, lighting control, haptic feedback (e.g., seat massage), HVAC system control, seat warmer control, etc. As one particular example, the system controller may select an audio clip from a set of available audio clips (e.g., based on the length and/or content of the available audio clips), and play the selected audio clip through the vehicle sound system.

Whereas current meditation applications typically involve the playback of continuous audio clips, embodiments of the present invention may play a variety of selected audio clips at selected times and/or order or playback, depending on the context of the particular driving situation, e.g., based on the current location or operation of the vehicle, environmental factors (e.g., weather, traffic data, traffic light data, etc.), and/or the current mental state of the driver (e.g., as determined by driver-monitoring sensor data or input from the driver). The concept of selective, context-dependent use of audio clips rather than playing one continuous audio clip provides flexibility to tailor and personalize the experience for the driver.

In addition, by utilizing vehicle-based sensor data and tailoring the driver experience to the actual driving context (and not simply for generic use), systems and methods disclosed herein provide (a) a safe experience (e.g., the driver experience may be suspended during driving maneuvers that require high driver focus), (b) a contextually relevant experience, and (c) a multi-sensory, holistic experience (e.g., the system may combine audio output with vehicle-based sensory modalities such as air flow, lighting control, heated seat, seat massage or other haptic seat feedback, etc.).

One aspect provides a method, implemented by a system controller, for generating a context-dependent experience for a driver of a vehicle. The method includes receiving driving context data regarding a driving situation at the system controller; accessing a set of content triggering rules defining at least one content triggering event; identifying a content triggering event based on (a) the received driver context data and (b) the set of content triggering rules; selecting a human-perceivable content element (from a set of human-perceivable driver experience actions) to output to the driver in response to identifying the content triggering event; and controlling an output device to output the selected human-perceivable content element to the driver.

In one embodiment, receiving driving context data at the system controller comprises receiving vehicle operation data related to a current operation of the vehicle, the vehicle operation data comprising at least one of (a) sensor-based vehicle data generated by at least one sensor monitoring at least one operational aspect of the vehicle, or (b) vehicle location data generated by a Global Positioning System (GPS) system.

In one embodiment, receiving driving context data at the system controller comprises (a) receiving vehicle operation data related to a current operation of the vehicle and (b) receiving environmental data regarding an environment external to the vehicle.

In one embodiment, receiving environmental data regarding an environment external to the vehicle comprises receiving environmental data from a remote server via wireless communications. In one embodiment, the received vehicle operation data comprises GPS data indicating a location of the vehicle, and the received environmental data includes comprises location-specific environment data associated with the location of the vehicle or a defined related location, wherein the location-specific environment data includes at least one of (a) weather data, (b) traffic data, (c) traffic light data, or (d) road classification data.

In one embodiment, the step of identifying a content triggering event based on (a) the received driver context data and (b) the set of content triggering rules comprises determining a predicted stop time and comparing the predicted stop time to at least one threshold time. In one embodiment, determining a predicted stop time comprises receiving traffic data or traffic light data from a remote server via wireless communications, and determining a predicted stop time based on the received traffic data or traffic light data.

In one embodiment, receiving driving context data at the system controller comprises accessing historical driver navigation data for the driver, and selecting a human-perceivable content element to output to the driver in response to identifying the content triggering event comprises: determining a current location of the vehicle; predicting a navigation route of the vehicle based on the current location of the vehicle and the historical driver navigation data for the driver; and selecting a human-perceivable content element to output to the driver based at least on the predicted navigation route of the vehicle.

In one embodiment, the method includes accessing historical driver navigation data for the driver; determining a current location of the vehicle; predicting a navigation route of the vehicle based on the current location of the vehicle and the historical driver navigation data for the driver; and selecting the set of human-perceivable content elements, from a larger set of human-perceivable content elements, based at least on the predicted navigation route of the vehicle.

In one embodiment, selecting a human-perceivable content element to output to the driver in response to identifying the content triggering event includes determining, by the system controller, a stressfulness stage for the driver, and selecting a human-perceivable content element based at least on the determined stressfulness stage.

In one embodiment, determining the stressfulness stage for the driver includes receiving vehicle operation data related to a current operation of the vehicle, receiving driver data regarding a mental state of the driver, and determining a stressfulness stage for the driver based on the received vehicle operation data and the received driver data regarding the mental state of the driver.

In one embodiment, receiving driver data comprises (a) receiving sensor-based driver data generated by at least one sensor configured to monitor the driver, or (b) accessing a driver profile including driver-specific data.

In one embodiment, the set of human-perceivable content elements comprises a set of audio clips having different lengths, and selecting a human-perceivable content elements to output to the driver in response to identifying the content triggering event includes determining a predicted stop time, and selecting, from the set of audio clips, an audio clip having a length consistent with the predicted stop time (e.g., equal to or less than the predicted stop time).

In one embodiment, controlling the output device to output the selected human-perceivable content element to the driver comprises controlling at least one speaker to play a selected audio clip.

In one embodiment, controlling the output device to output the selected human-perceivable content element to the driver includes controlling a display screen or other lighting, controlling a heater or haptic feedback device provided in a seat, and/or controlling an HVAC system of the vehicle.

Another aspect of the invention provides a system for generating a context-dependent experience for a driver of a vehicle. The system includes at least one driving context data source provided in the vehicle and configured to generate or access driving context data regarding a driving situation, an output device configured to output human-perceivable content, and a system controller. The system controller is configured to receive the driving context data from the at least one driving context data source; access a set of content triggering rules defining at least one content triggering event; identify a content triggering event based on (a) the received driver context data and (b) the set of content triggering rules; in response to identifying the content triggering event, select a human-perceivable content element to output to the driver, from the set of human-perceivable content elements; and control the output device to output the selected human-perceivable content element to the driver.

In one embodiment, driving context data sources configured to generate or access driving context data regarding a driving situation include at least one of (a) at least one sensor configured to generate sensor data regarding at least one operational aspect of the vehicle or (b) a GPS system configured to generate vehicle location data.

In one embodiment, driving context data sources configured to generate or access driving context data regarding a driving situation include (a) at least one vehicle operation data source configured to generate vehicle operation data related to a current operation of the vehicle and (b) at least one environmental data source configured to generate or obtain environmental data regarding an environment external to the vehicle.

In one embodiment, the environmental data source comprises a wireless communications interface provided in the vehicle and configured to receive environmental data from a remote server via wireless communications.

In one embodiment, the vehicle operation data generated by the vehicle operation data source comprises GPS data indicating a location of the vehicle, and the environmental data received from the remote server includes comprises location-specific environment data associated with the location of the vehicle or a defined related location, wherein the location-specific environment data includes at least one of (a) weather data, (b) traffic data, (c) traffic light data, or (d) road classification data.

In one embodiment, the system controller is configured to select a human-perceivable content element to output to the driver in response to identifying the content triggering event by a selection process including (a) determining a stressfulness stage for the driver, and (b) selecting a human-perceivable content element based at least on the determined stressfulness stage.

In one embodiment, the system controller is configured to determine the stressfulness stage for the driver by a stage analysis process including receiving vehicle operation data related to a current operation of the vehicle, receiving driver data regarding a mental state of the driver, and determining a stressfulness stage for the driver based on the received vehicle operation data and the received driver data regarding the mental state of the driver.

In one embodiment, the set of human-perceivable content elements comprises a set of audio clips having different lengths, and the system controller is configured to select a human-perceivable content element to output to the driver in response to identifying the content triggering event by a selection process including determining a predicted stop time and selecting an audio clip, from the set of audio clips, having a length consistent with the predicted stop time.

In one embodiment, the output device configured to output human-perceivable content comprises at least one speaker provided in the vehicle, the selected human-perceivable content element comprises a selected audio clip, and the system controller is configured to control the at least one speaker to play the selected audio clip.

In one embodiment, the output device configured to output human-perceivable content includes a display screen or other lighting, a heater or haptic feedback device provided in a seat, and/or a vehicle HVAC system.

BRIEF DESCRIPTION OF THE FIGURES

Example aspects of the present disclosure are described below in conjunction with the figures, in which.

Figure 1:
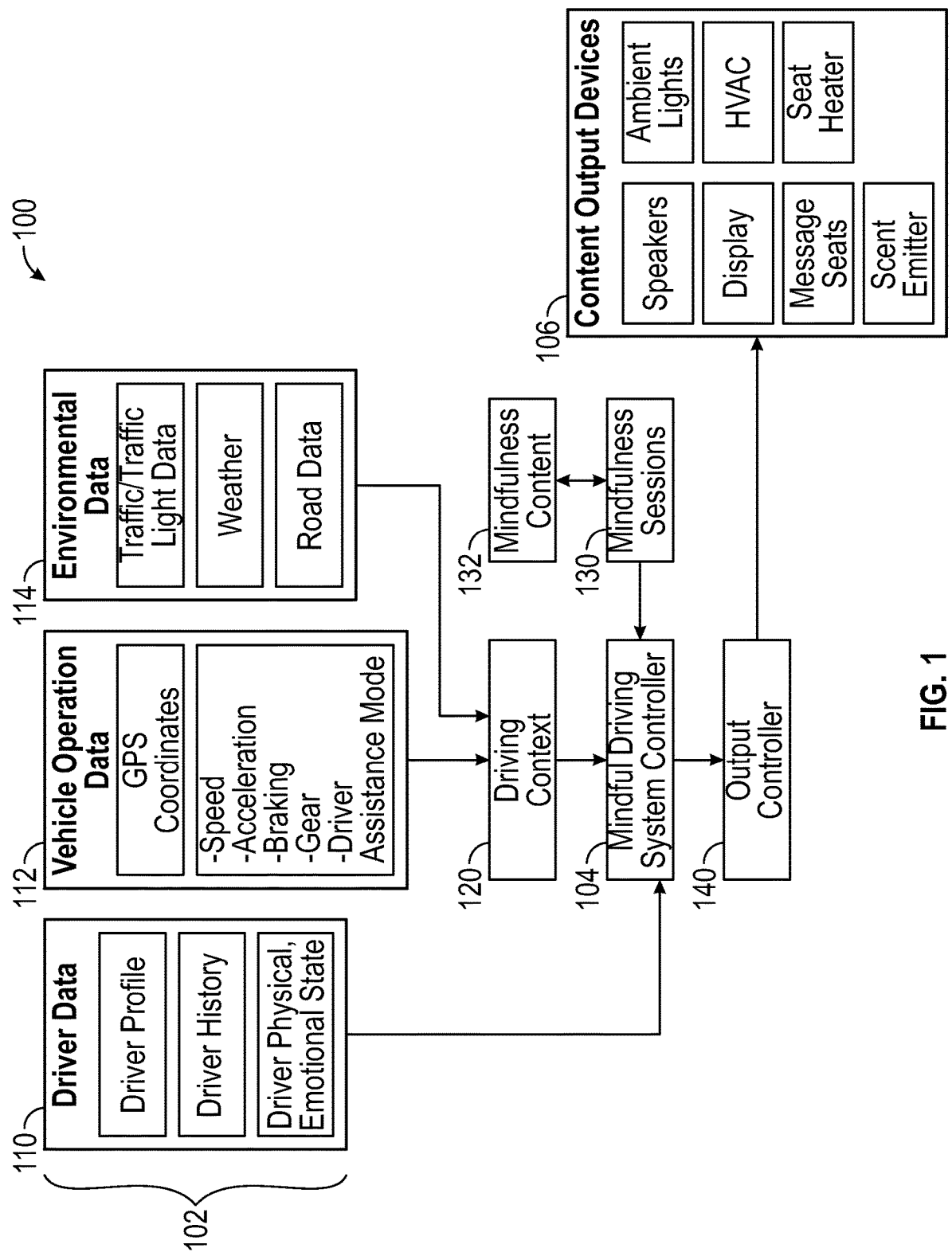
FIG. 1 illustrates an example driver experience system for generating a context-dependent experience for a vehicle driver, e.g., to relax or manage the driver's stress level, according to example embodiments.

It should be understood that the reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

As noted above, embodiments of the present invention provide driver experience systems and methods for generating a context-dependent experience for a driver during a driving session, e.g., playing selected audio clips in a context-dependent manner, to relax or otherwise enhance the driver's mental state. Various data sources may collect driving context data regarding a driving situation and/or driver data regarding the driver. Driving context data may include (a) vehicle operation data regarding the operation of the vehicle, e.g., generated by vehicle-based sensors, and (b) environmental data regarding an environment external to the vehicle, e.g., weather data, traffic data, or traffic light data. Such environmental data may be obtained at the vehicle from remote server(s) via wireless communication links. Driver data may include (a) stored data regarding the driver, e.g., a driver profile, historical navigational data of the driver, and/or the historical behavioral responses of the driver to context-dependent experiences presented by the system, and/or (b) driver state data regarding the driver's mental state, e.g., as determined by driver-monitoring devices or based on input from the driver.

A system controller may be configured to collect the driving context data and/or driver data from the various data sources, and identify content triggering events during the driving session based on (a) the relevant driving situation indicate by the driver context data and (b) a set of content triggering rules. For example, the system controller may determine the vehicle is stopped at a red light for a particular amount of time (e.g., predicted based on known information). In response to identifying the content triggering event, the system controller may select a human-perceivable content element, and control the output device to output the selected content element to the driver. For example, the system controller may select an audio clip from a set of available audio clips (e.g., based on the length and/or content of the available audio clips), and play the selected audio clip through the vehicle sound system. In some embodiments, the system controller may select particular content elements to output to the driver during the driving session based on selected driving context data and/or driver data, as discussed below.

The "driver experience" systems and methods are also referred to herein as a "mindful driving" systems and methods, as the generated experience (e.g., delivered audio content) may focus on core elements of mindfulness (e.g., breathing, being fully aware, being non-reactive/accepting, etc.) and with emphasis on a driving experience (e.g., the driver noticing what they see, feeling the movement of the vehicle, hearing sounds from the engine, accepting heavy traffic, etc.).

FIG. 1 illustrates an example driver experience system 100 for generating a context-dependent experience for a vehicle driver, e.g., to relax or manage the driver's stress level, according to example embodiments. Driver experience system 100 may include a system controller 104 configured to receive or generate various types of context data 102, and select content elements to output to the driver, in a context-dependent manner, via one or more output devices 106. In the illustrated example, context data 102 includes driver data 110, vehicle operation data 112, and environmental data 114.

Driver data 112 may include any known or detected information regarding a driver that may be relevant to the system controller 104 for context-based selection and output of content during a driving session. As shown, example types of driver data 110 may include stored driver profiles for one or more drivers, driver history information, and information regarding the driver's physical or emotional state.

Vehicle operation data 112 may include any data regarding the current, past, or future (e.g., predicted) operation of the vehicle that may be relevant to the system controller 104 for context-based selection and output of content during a driving session. As shown, example types of vehicle operation data 112 may include GPS data (or other vehicle location data) and data from various sensors or systems of the vehicle, e.g., data indicating vehicle speed and acceleration, braking data, transmission data (e.g., indicating the currently selected gear), and a currently active driver assistance mode or status (e.g., in a vehicle with self-driving functionality).

Environmental data 114 may include any data regarding an environment external to the vehicle that may be relevant to the system controller 104 for context-based selection and output of content during a driving session. As shown, example types of environmental data 114 may include traffic data, traffic light data, weather data, and road classification data. Each type of environmental data 114 may be generated by sensors or systems provided at the vehicle, or obtained at the vehicle from remote server(s) via wireless communication links, e.g., using a cellular communication system.

As shown in FIG. 1, system 100 may analyze various data, e.g., vehicle operation data 112 and environmental data 114, to determine a driving context for the current driving situation, as indicated at 120.

The system controller 104 may select and implement a mindfulness session 130 having a defined session protocol and a selected session theme. The session protocol may define rules used by the session manager to determine when and how to output content elements (e.g., audio clips) to the driver, e.g., based on the relevant driving context. The session theme may define a set of content elements (e.g., audio clips) related to a particular theme, for example, "starting the day," "letting go of work," "unwinding from family stresses," or "staying alert and focused." The session theme to be implemented at any particular time may be selected in any suitable manner, e.g., automatically by the system controller 104 (e.g., based on the current driving context and/or driver information) or by the driver (e.g., by a speech-based command or via a touchscreen or other user interface provided by the vehicle or a user mobile device, e.g., the driver's smartphone). The system controller 104 may analyze the current driving context 120 in view of the rules defined by the active mindfulness session 130 to identify content triggering event, also referred to herein as "contextual triggers."

For each identified content triggering event, the system controller 104 may select one or multiple content elements 132 (e.g., audio clip, HVAC control, etc.) from an available set of content elements to output to the driver. The system controller 104 may use relevant driver data 110 and/or selected driving context data 120 for selecting the appropriate content element(s) 132. In some embodiments, the system controller 104 may determine a current stressfulness stage for the driver, e.g., based on (a) relevant vehicle operation data indicating a level of driver workload or required driver concentration, (b) relevant environmental data (e.g., weather, traffic load, road conditions, etc.) and (c) driver data regarding a current mental state of the driver. The system controller 104 may then select particular content elements for output based on the determined stressfulness stage. The system controller 104 may also consider the length of available content elements (e.g., the length of different audio clips) when making content element selections. For example, the system controller 104 may be configured to determine (e.g., predict) a duration that the vehicle will remain in stopped (e.g., while waiting at a red light), and select an audio clip to play based at least on the respective lengths of the available audio clips, e.g., such that the audio clip completes before the stopped vehicle resumes driving.

After selecting one or more particular content element, the system controller 104 may signal an output controller 140 to control one or more content output devices 106 to output the selected content. As shown in FIG. 1, example types of content output devices 106 include speakers, a display (e.g., a console, mapping, or infotainment display), lighting, HVAC system components, seat heaters, a seat massager, and a scent emitter. In some embodiments or instances, a particular content elements may include multiple modality components intended to be output simultaneously to provide the desired experience. Thus, the output controller 140 may control multiple different output devices 106 to output multiple content modalities simultaneously, e.g., by playing an audio clip while blowing cool air via the HVAC system.

Figure 2:
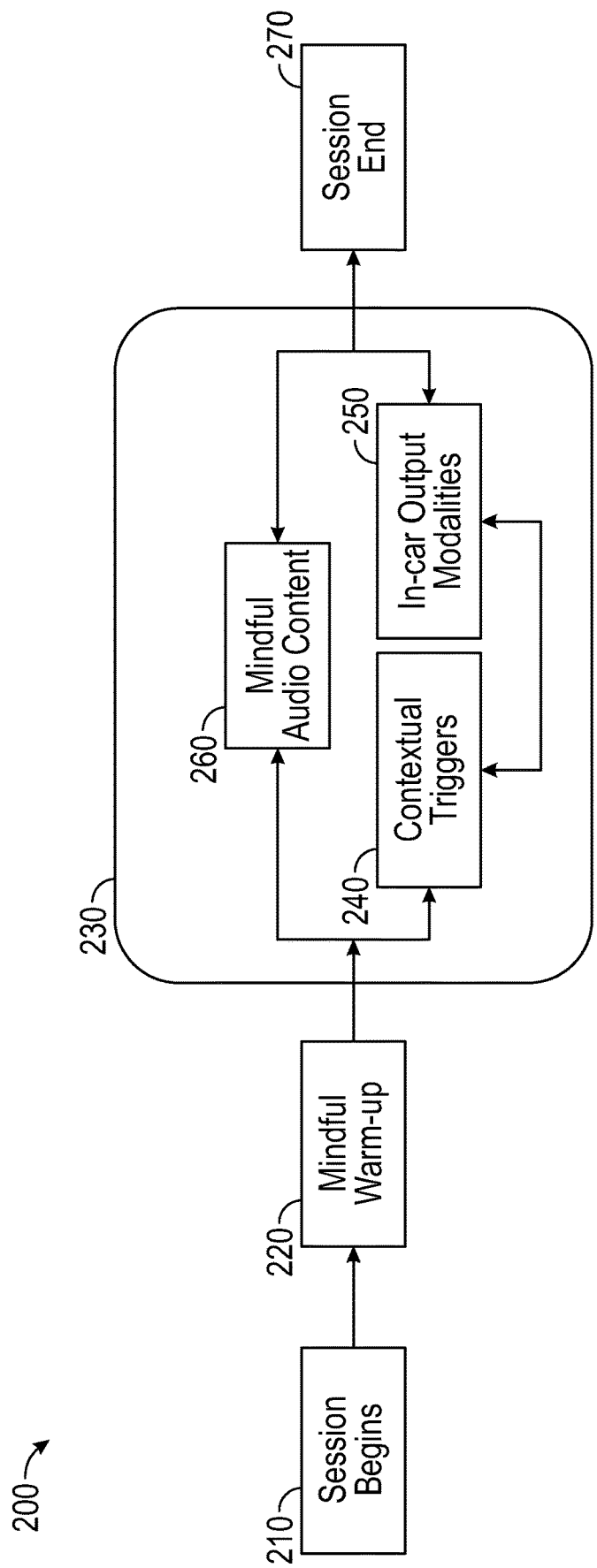
FIG. 2 illustrates a process flow of an example context-dependent driving experience session (mindfulness session) provided and managed by the driver experience system shown in FIG. 1, according to example embodiments.

FIG. 2 illustrates a process flow 200 of an example context-dependent driving experience session (mindfulness session) provided and managed by the driver experience system 100 shown in FIG. 1, according to example embodiments. At 210, the driving experience session begins. The session may begin automatically, e.g., upon starting the vehicle, placing the vehicle into driving gear, upon a detection of vehicle movement, or upon detection of another defined session initiation event or condition, e.g., detection of a stressfulness level above a defined threshold, or detection of a particular driving situation (e.g., a vehicle stoppage having a predicted duration of more than 2 minutes). As another alternative, the session may begin in response to a defined user action (e.g., by the driver or a passenger), for example the user selecting a driving experience session via a touchscreen or other interactive display or interface provided in the vehicle. Alternatively, the session may begin in response to a defined user action (e.g., by the driver or a passenger), for example the user selecting a driving experience session via a touchscreen or other interactive display or interface provided in the vehicle.

As 220, the driver experience system controller may output a mindful warm-up or introduction, e.g., including predefined audio clip(s) and/or other predefined content elements. In some embodiments, contextual triggering of content may be suspended during the warm-up/introduction phase 220. After the warm-up/introduction phase 220, the session advances to a context-based content output phase 230. At phase 230, the system controller collects various context data and performs contextual triggering at 240 to identify content triggering events. The system controller may then select content elements to output, based on the current context data, and output such content elements via one or more content output modalities 250. For audio content, the system controller may select particular audio clips for output, based on the current context data and/or based on the length of the available audio clips.

The driving experience session ends at 270, e.g., at the end of a defined time (e.g., 10 minutes), automatically upon a defined triggering event, or in response to a defined user input. For example, the session may end automatically in response to a "reaching destination" trigger determined by the system controller (e.g., based on known route and current location data), or upon turning off the vehicle, placing the vehicle into a parking gear, or upon detection of a stressfulness level below a defined threshold. As another example, the session may be ended by a defined user action (e.g., by the driver or a passenger), for example the user selecting a displayed "end mindfulness session" interface, or other user action configured to terminate the session, e.g., a user turning on the radio or interacting with an in-vehicle mapping system.

Figure 3:
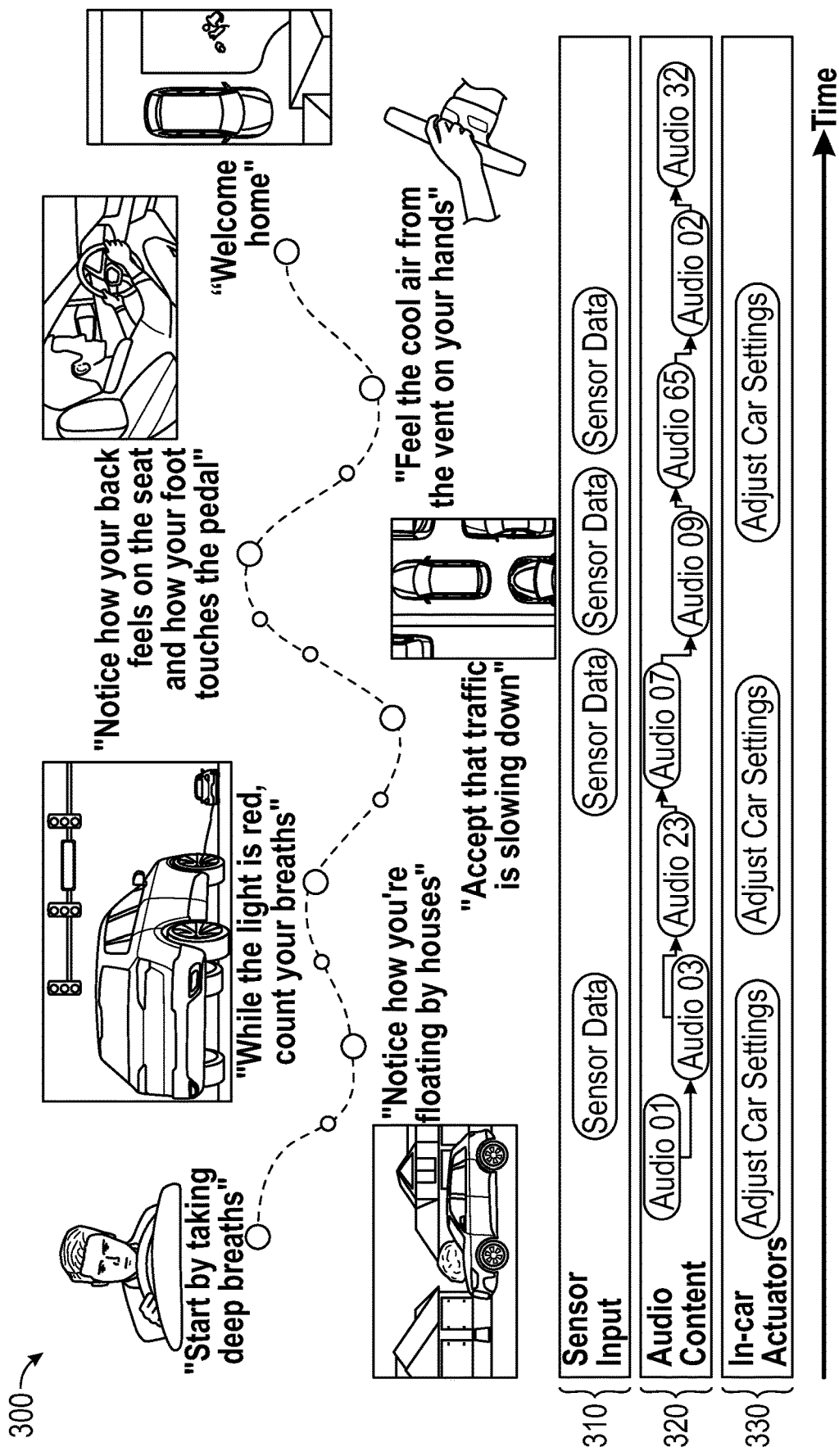
FIG. 3 illustrates a process flow of an example context-dependent driving experience session (mindfulness session), showing the triggering and output of example content elements, according to one example embodiment.

FIG. 3 illustrates a process flow 300 of an example context-dependent driving experience session (mindfulness session), showing the triggering and output of example content elements, according to one example embodiment. In this example, the driver experience system is configured to output content in the form of (a) audio content and (b) control of other vehicle-based out devices (actuators), e.g., the vehicle air conditioning system. The lower portion of FIG. 3 shows example instances of sensor data collection 310, output of selected audio clips 320, and output of non-audio content (actuator control) 330, with respect to time. The upper portion of FIG. 3 shows example content elements output to the driver during the driving experience session.

Figure 4A:
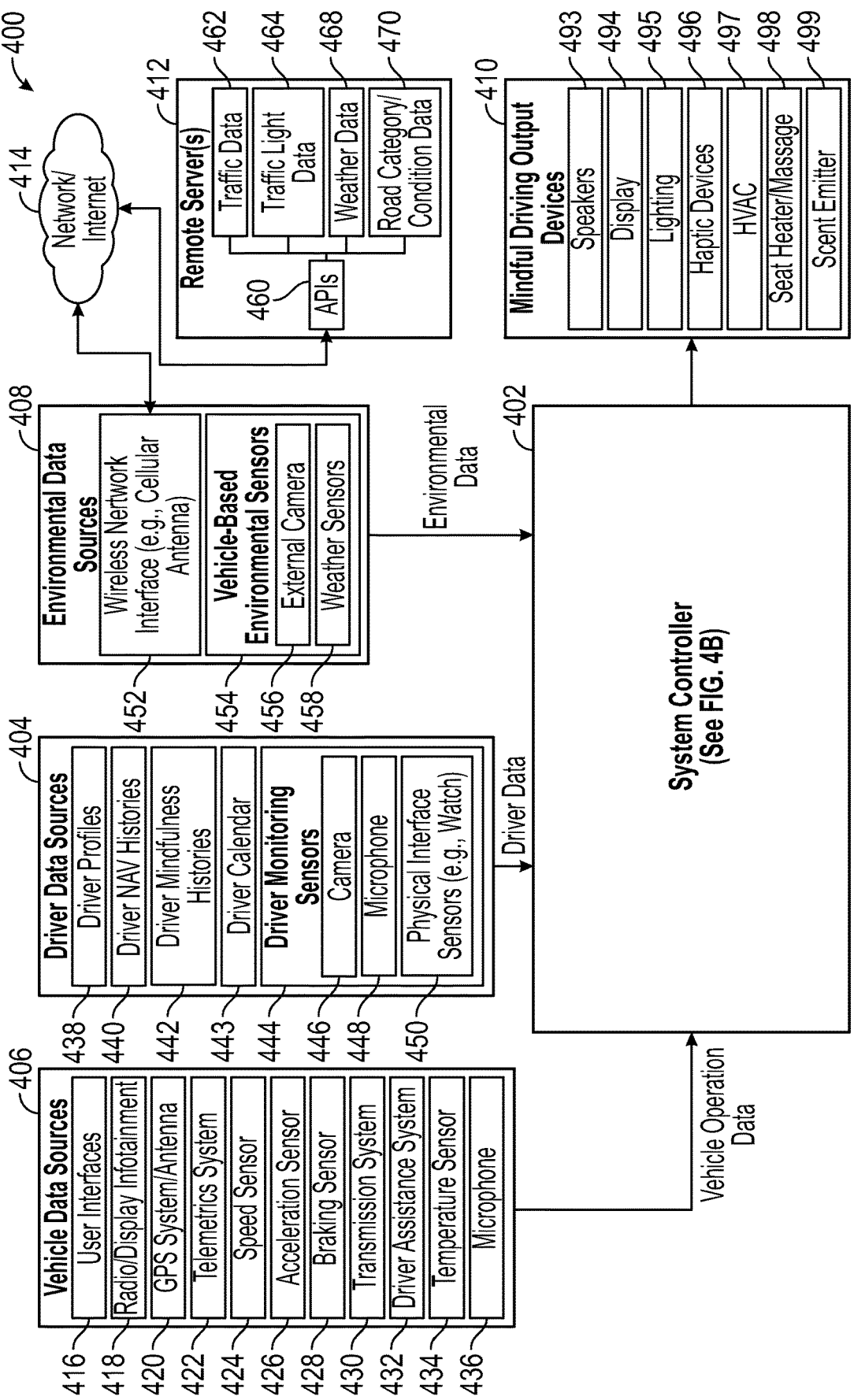
FIGS. 4A-4B illustrate an example driver experience system for generating a context-dependent experience for a vehicle driver, according to one example embodiment.
Figure 4B:
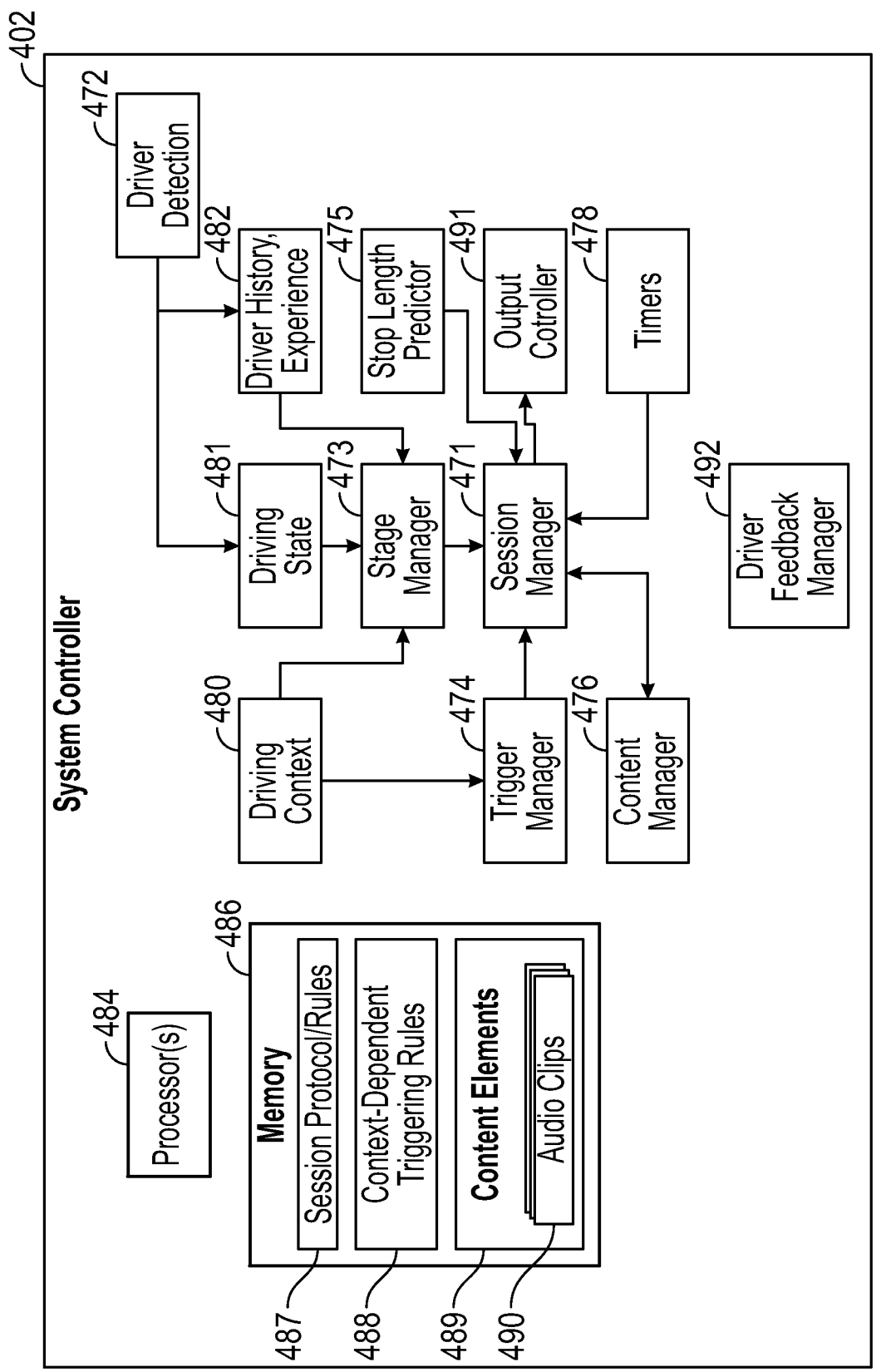

FIGS. 4A-4B illustrate an example driver experience system 400 for generating a context-dependent experience (mindfulness session) for a vehicle driver, e.g., to relax or manage the driver's stress level, according to example embodiments. Driver experience system 400 shown in FIG. 4A may be viewed as a more specific representation of the driver experience system 100 shown in FIG. 1.

Driver experience system 400 may include a system controller 402 configured to receive or generate various types of context data from various context data sources, and select content elements to output to the driver, in a context-dependent manner, via one or more output devices 410. In the illustrated example, context data sources may include (a) driver data sources 404 configured to provide driver data to system controller 402, (b) vehicle operation data sources 406 configured to provide vehicle operation data to system controller 402, and (c) environmental data sources 408 configured to provide environmental data to system controller 402.

Any one or more vehicle data sources 406, driver data sources 404, and/or environmental data sources 408 may be stored or located remotely, e.g., on one or more remote server 412, and accessible by controller 401 via a communications network 414. Communications network 414 may include the internet, one or more local area network (LAN), wireless LAN (WLAN), wide area network (WAN), mobile networks (e.g., GSM, CDMA, 3G, 4G, LTE, 5G, etc.), and/or any other type of public or private network including wired and/or wireless communication links. System controller 402 may access such remote data via any suitable wireless communication link(s) with network 414, e.g., mobile data links (e.g., GSM, CDMA, 3G, 4G, LTE, 5G, etc.), WLAN links, or any other type of wireless links. For example, as discussed below, system 400 may include a wireless network interface 452 for receiving wireless communications of environmental data via network 414.

In some embodiments, vehicle operation data provided by vehicle operation data sources 406 and environmental data provided by environmental data sources 408 may collectively define a driving context 480. As discussed below in more detail, the driving context 480 may be used by (a) a trigger manager 474 for identifying content triggering events and/or (b) a stage manager 473 for determining a current stressfulness stage, which may be used for selecting appropriate content elements to output to the driver.

Driver data sources 404 may include various data sources configured to generate, store, or access driver data for communication to system controller 402. Example driver data sources 404 include (a) driver profiles 438 for one or more drivers (b) historical navigation data 440 for one or more drivers, (c) historical mindfulness session data 442 for one or more drivers, and (d) driver calendar data 443. Driver data 438, 440, 442, 443 may be stored in memory accessible to system controller 402, e.g., in vehicle-based memory or in remote storage accessible to system controller 402 via communications network 414.

A driver profile 438 for a respective driver may indicate known physical and/or mental attributes of the driver, a driving experience/skill level, and settings or preferences for outputs generated by the driver experience system, for example, preferred or non-preferred types of content (e.g., preferred or non-preferred types of audio content or specific audio clips) or modalities of content delivery or specific content elements. The driver profile 438 may also include driver identification information for automatically identifying the driver, e.g., allowing system controller 402 to provide a driving experience tailored to the current driver. The driver identification information may include, for example, key information integrated in the driver's key and automatically readable by the vehicle, e.g., upon a user action performed on a key fob (e.g., to unlock the door), upon entry into the vehicle, or upon insertion of the key into the ignition. As another example, the driver identification information may include voice data allowing voice-based recognition of the driver. As another example, the driver identification information may include image(s) of the driver, for camera-based facial recognition of the driver.

A driver profile 438 may be input by a user, e.g., via data entry at a vehicle-based interface (e.g., touchscreen), or via a mobile application or web-based application configured to communicate with system controller 402.

Historical navigation data 440 for a driver may include historical data regarding driving routes taken by the driver. System controller 402 may be configured for predictive analysis of such historical navigation data, e.g., allowing the system controller 402 to determine a frequent route (e.g., between home and work, or between home and the airport) and select particular mindfulness sessions and/or content elements based on such predictive knowledge. In addition, system controller 402 may correlate a driver's historical navigation data may be correlated with dates, times, or days of the week for improved predictive analysis.

Historical mindfulness session data 442 for a driver may include historical data regarding prior mindfulness sessions delivered to the driver, the driver's response to such mindfulness sessions and/or individual content elements, a level of mindfulness expertise of the driver, and the driver's personal mindfulness settings, e.g., learned from previous sessions via artificial intelligence (user observation plus learning).

As discussed below, selected driver profile data 438, historical navigation data 440, historical mindfulness session data 442, a driver calendar data 443 may collectively define a driver history/experience context 482 used by a stage manager 473 for determining a current stressfulness stage, which may be used for selecting appropriate content elements to output to the driver.

Driver calendar data 443 may include a calendar or other scheduling information for the driver, e.g., indicating the driver's work schedule and/or other events. System controller 402 may use such driver calendar data 443 as an input for determining the current driving route and/or the driver's current mental state, and/or for automatic selection of a particular session theme. For example, system controller 402 may assess the driver's mental state based on the type of activity the driver has been engaged in (e.g., work, shopping, school, doctor's appointment, etc.), as well as the level of activity/busyness indicated by the calendar.

In some embodiments, driver data sources 404 may also include one or more driver monitoring sensors 444 configured to monitor physiological attributes of the driver, for example the driver's respiratory rate, heart rate, speech attributes (e.g., volume, frequency tone, etc.), body movements, etc. As shown, driver monitoring sensors 444 may include at least one driver-facing camera 446, a microphone 448, and/or physical interface sensor 450. A physical interface sensors 450 may include any type of sensor that physically interfaces with the driver to detect one or more physiological attributes of the driver, for example (a) a smartwatch configured to monitor the driver's heart rate, blood pressure, respiratory rate, etc., and wirelessly communicate such data to system controller 402, or (b) a sensor integrated in the steering wheel, driver's seat, or other vehicle component and configured to detect or monitor one or more physiological attributes of the driver.

In some embodiments, system controller 402 may use such data from driver monitoring sensor(s) 444 for determining a driver mental state 481. As discussed below, a stage manager 473 may use the driver mental state 481 (e.g., in combination with the driving context 480 and/or driver mental state 481) for determining a current stressfulness stage, which may be used for selecting appropriate content elements to output to the driver. For example, if system controller 402 determines the driver mental state 481 is relaxed, system controller 402 may select an engaging session theme (or engaging content) appropriate for a relaxed driver. Alternatively, if the determined driver mental state 481 is highly stressed, system controller 402 may select a calming session theme (or calming content) intended to calm the highly stressed driver. In some embodiments, the system controller 402 may dynamically adapt a session during execution, e.g., based on the real-time driving context data 480 and/or driver mental state data 481.

Vehicle operation data sources 406 may include various data sources configured to generate, store, or access vehicle operation data for communication to system controller 402. Example vehicle operation data sources 404 include at least one (a) user interface 416 allowing user selection of various operational settings, (b) radio/display/infotainment system 418, (c) GPS system 420, (d) telemetrics system 422, (e) speed sensor 424, (f) acceleration sensor 426 (e.g., an accelerometer or accelerator pedal position sensor), (g) braking sensor 428, (h) transmission system 430 (e.g., indicating active gear information), (i) driver assistance system 432 (e.g., in a vehicle with self-driving functionality), (j) temperature sensor 434, (k) microphone, and/or any other types of sensors or systems for monitoring any operational aspect of the vehicle.

Any one, some, or all of the vehicle data sources 406 may be connected with a Controller Area Network bus (CAN bus) connected and configured to deliver vehicle-related data to system controller 402.

Environmental data sources 408 may include various data sources configured to generate, store, or access environmental data for communication to system controller 402. Environmental data may include any data regarding an environment external to the vehicle that may be usable by system controller 402 for context-based selection and output of content during a driving session. Example types of environmental data 114 may include traffic data, traffic light data, weather data, and road classification data.

As shown, example environmental data sources 408 include (a) a wireless network interface 452 for obtaining remotely-generated or remotely-stored environmental data and/or (b) environmental sensors 454 provided at the vehicle. Wireless network interface 452 may be configured for wireless communications with remote server(s) 412 or other remote devices via communications network 414, e.g., via a cellular communication system (e.g., GSM, CDMA, 3G, 4G, LTE, 5G, etc.), wireless LAN, or any other type of wireless communications. Wireless network interface 452 may includes any suitable wireless communications hardware, software, and/or firmware for accessing remote environmental data.

In some embodiments, wireless network interface 452 may be configured to interface with APIs 460 for accessing various data from one or more remote server 412, for example traffic data 462, traffic light data 464, weather data 468, and road classification and/or condition data 470. System controller 402 may use the current and/or predicted location of the vehicle, e.g., based on data from GPS system 420 and/or driver navigation history data 440, to request and obtain location-specific environmental data, e.g., location-specific weather, traffic, traffic light, and/or road data.

As discussed above, in some embodiments, environmental data provided by environmental data sources 408 and vehicle operational data provided by vehicle operational data sources 406 may collectively define a driving context 480. The driving context 480 may be used by (a) a trigger manager 474 for identifying content triggering events and/or (b) a stage manager 473 for determining a current stressfulness stage, which may be used for selecting appropriate content elements to output to the driver.

Mindfulness output devices 410 may include any suitable devices for outputting human-perceptible content related to a mindfulness session. Example output devices 410 include speakers 493, a display 494 (e.g., touchscreen or other display visible to the driver), interior vehicle lighting 495, haptic devices 496 (e.g., integrated to the steering wheel), an HVAC system 497, seat heaters or seat massagers 498, and scent emitters 499.

In general, system controller 402 is configured to implement a mindfulness session (e.g., selected from a variety of different mindfulness sessions) for a driving session. The mindfulness session may be defined by a session protocol and/or rules 487 for determining when to output content elements (e.g., audio clips), and which content elements (e.g., audio clips) to output in each situation.

System controller 402 is configured to receive the various types of context data from driver data sources 404, vehicle operation data sources 406, and environmental data sources 408, and select content elements to output to the driver, in a context-dependent manner, via one or more output devices 410. As shown, system controller 402 may include various interconnected control units, including a session manager 471, a driver detection system 472, a stressfulness stage manager 473, a trigger manager 474, a stop length predictor 475, a content manager 476, timers 478, an output controller 491, and a driver feedback manager 492 for providing various functionality of driver experience system 400. Any one or more of the various control units of system controller 402 may receive data from various data sources (e.g., driver data sources 404, vehicle data sources 406, environmental data sources 408, etc.), process such data, and communicate signals with other control unit(s) to provide the various functionality of system controller 402 disclosed herein.

Each of the various components of system controller 402 may include any hardware, software, and/or firmware components for performing the respective functionality of each component. For example, each component of system controller 402 may comprise software and/or firmware stored in non-transitory memory 486 and executable by at least one processor 484 (e.g., microprocessor, microcontroller, FPGA, etc.). As shown, memory 486 may also store session protocols and rules 487, content triggering rules 488, and mindfulness content 489, e.g., including audio clips 490 and/or other types of content elements.

Session manager 471 is configured as the central control system of system controller 402. Session manager 471 may be configured to (a) receive content triggering events from content triggering manager 474, (b) select context-dependent content elements to output to the driver (e.g., based on input from stressfulness stage manager 473, stop length predictor 475, and/or timers 478), and control relevant output devices 410 to output the selected content elements to the driver.

Driver detection system 472 may be configured to automatically identify the current driver, e.g., based on an automatic detection of driver-specific information stored in driver profile 438, to allow system controller 402 to provide a driving experience tailored to the particular driver. For example, driver detection system 472 may identify the driver based on driver ID information obtained from the driver's key or key fob. For example, driver detection system 472 may identify the driver based on images from camera 446 and stored driver images in driver profile(s) 438.

Upon identifying the current driver, system controller 402 may access the relevant driver profile 438, e.g., to access driver-specific driver data 482, e.g., driver history, experience/skill level, or settings or preferences for mindfulness outputs, which may be used as input by stressfulness stage manager 473. In addition, system controller 402 may access stored physiological or mental data regarding the identified driver, which may be used (e.g., as baseline data) for determining the driver's current mental state based on data from driver monitoring sensors 444.

Stressfulness stage manager 473 is configured to determine a current stressfulness stage, e.g., based on (a) the current driving context 480, (b) the current driver mental state 481, and/or (c) the driver history and experience 482. The current stressfulness stage represents an estimated level of stress experienced by the driver.

Content triggering manager 474 is configured to identify content triggering events at various times based on (a) the current driving context 480 and (b) the session protocol or rules 487 for the active mindfulness session, and notify the session manager 471 of each identified content triggering event.

Stop length predictor 475 may be configured to predict when a vehicle will stop and/or how long the vehicle will remain stopped, based on any suitable input data predictive of the length of a vehicle stop, for example (a) vehicle-related data collected by any vehicle data source(s) 406, e.g., delivered to system controller 402 as CAN signals via the vehicle's CAN bus, (b) traffic data 462 and/or traffic light data 464 corresponding with the detected GPS location of the vehicle, (c) historical driver data 440, (d) driver data collected by driver monitoring sensor(s) 444 (e.g., detected movements of the driver's head) and/or any other suitable data. Example types of CAN signals used as input for the stop length predictor 475 include a time series of brake pressure, steering wheel angle, acceleration, and velocity (speed) of the vehicle. Example traffic data 462 used as input for the stop length predictor 475 includes data indicating the presence and location of vehicle(s) in front of the vehicle being analyzed.

In one embodiment, stop length predictor 475 may utilize a recurrent neural network (RNN), e.g., a long short-term memory (LSTM), to predict a stop duration based on various input data. In some embodiments, system controller 402 may use predicted stop duration data from stop length predictor 475 to (a) determine whether a vehicle stop is long enough to trigger a content output and/or (b) selectively identify particular content elements suitable for the predicted stop length, e.g., content elements having a duration shorter than the predicted stop length, or shorter than the predicted stop length less a predefined buffer time (e.g., 5 seconds).

Content manager 476 is configured to load selected content elements 489 (e.g., audio clips 490) from memory 486, and cooperate with the output controller 491 to control output devices 410 to output selected content elements.

Timers 478 may monitor the duration of any events or sessions relevant to system controller 402. For example, a session timer may record the ongoing duration of the active mindfulness session, and the duration of various stages within the session. As another example, a stopped vehicle timer may monitor the time the vehicle is stopped, which may be used by content triggering manager 474 for identifying certain content triggering events, and/or other components of system controller 402.

Driver feedback manager 492 is configured to observe the driver during a mindfulness session (e.g., using driver monitoring sensors 444) and store driver behavior or other feedback as historical driver mindfulness data 442.

In operation, session manager 471 may be configured to select and manage a mindfulness session for a driver based on input from stage manager 473, content triggering manager 474, stop length predictor 475, content manager 476, and timers 478. During the session, content triggering manager 474 may identify content triggering events at various times based on the currently determined driving context 480 and the relevant session protocol or rules 487, and notify the session manager 471 of each content triggering event.

For each identified content triggering event, the session manager 471 may select an appropriate content element 489 (e.g., audio clip 490) to output to the driver, based on (a) the driving context 480, (b) the current stressfulness stage as determined by stage manager 473, and (c) if relevant, a stop duration predicted by stop length predictor 475.

The system controller 104 may then select particular content elements (e.g., audio clips) for output based on the determined stressfulness stage. The system controller 104 may also consider the length of available content elements (e.g., the length of different audio clips) when making content element selections. For example, the system controller 104 may be configured to determine (e.g., predict) a duration that the vehicle will remain in stopped (e.g., while waiting at a red light), and select an audio clip to play based at least on the respective lengths of the available audio clips, e.g., such that the audio clip completes before the stopped vehicle resumes driving.

Upon selecting a content element 489 to be output, content manager 476 may access and load the content element 489 from memory 486, and instruct output controller 491 to control selected output device(s) 410 to output the selected content element 489.

As discussed above, stressfulness stage manager 473 may monitor the current stressfulness stage for the driver, e.g., based on (a) the current driving context 480 (which may incorporate relevant vehicle operation data 406 and environmental data 408), (b) the current driver mental state 481 (e.g., as determined based on driver monitoring sensors 444), and/or (c) driver history and experience/skill data 482. In one embodiment, stressfulness stage manager 473 (a) determines a base stressfulness stage, and then (b) adjusts the base stressfulness stage based on any relevant adjustment factors. The stressfulness stage may represent a level of workload for the driver (e.g., mental, physical, etc.) and/or a level of driving engagement.

Tables 1 and 2 below illustrate one example implementation of an embodiment that defines six different stages, ranging from Stage 0 (e.g., when the driver is not engaged in driving) to Stage 5 (e.g., full driver attention is needed to control the vehicle).

In this embodiment, stressfulness stage manager 473 first uses Table 1 to determine a base stressfulness stage, based on driving context data 480. Then, stressfulness stage manager 473 uses Table 2 to determine adjustments (if any) to the base stressfulness stage, based on environmental data (relevant traffic and weather conditions), driver data (driver experience/skill level and historical navigational data), and sensor-based driver monitoring data (regarding the driver's respiratory rate).

TABLE 1

Base stressfulness stage classification based on driving context

| Stage 0 | Stage 1 | Stage 2 | Stage 3 | Stage 4 | Stage 5 |
|---|---|---|---|---|---|
| Not driving | Simple driving conditions & not moving | Very simple or assisted driving & moving | Normal level of driving workload | High level of driving workload | Driving - highly stressful |
| Parked | Highway driving → ADAS on | Highway driving (manual) | Rural area driving (suburbia) | Urban driving | Uncontrolled intersection |
| Self-Driving mode | Stopped at a red light | Stopped at a STOP sign | Countryside driving | Driving in a parking lot | Emergency breaking |
| | | | lane change - highway | Merging onto highway | Backing up |
| | | | Lane merging Leaving highway | Lane change, city School area Pedestrian Xing Roundabout | Parking vehicle |

TABLE 2

Stressfulness stage adjustment factors

| −1 Stage | +1 Stage | +2 Stage | Explanation |
|---|---|---|---|
| Driving context specific | | | |
| ADAS ON | | | If driver assistance functions are on, the workload is automatically reduced as the vehicle supports the driver with the driving task |
| Light to no traffic | | | If little or no traffic, the workload decreases |
| | Heavy traffic | | In heavy traffic, workload increases (e.g., independent from the road categorization) |
| | Bad weather conditions | | In bad weather, workload increases |
| Driver specific - based on user profile, historical navigational data | | | |
| Route familiarity | | | If the driver is very familiar with the route (PNAV) the workload decreases |
| Expert driver | Insecure driver | | Driving experience (e.g., from user profile, learned over time) |
| Driver specific - based on sensor-based driver monitoring | | | |
| Respiratory rate <90% of baseline rate | | | |
| | Respiratory rate above 110% baseline rate | | |
| | | Respiratory rate above 125% baseline rate | |

Figure 5:
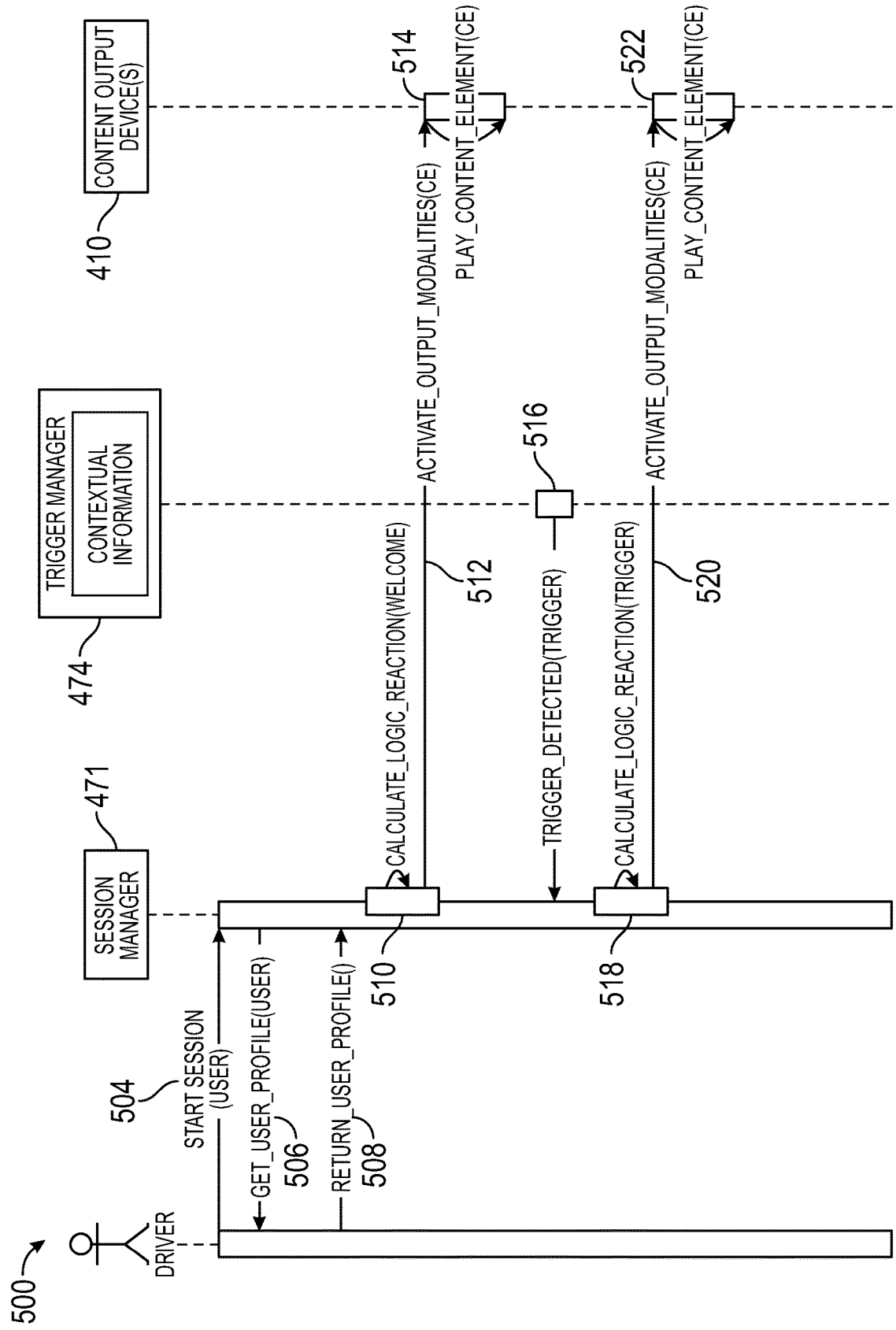
FIG. 5 shows an example mindfulness session flow illustrating the playback of a warm-up/welcome audio clip and a driving context-triggered audio clip, according to one example embodiment.

FIG. 5 shows an example process flow 500 of a driving experience session, illustrating the playback of a warm-up/welcome audio clip and a driving context-triggered audio clip, according to one example embodiment. At 504, the session manager 471 may start the driving experience session, e.g., automatically in response to a defined action (e.g., starting the vehicle, placing the vehicle into "drive" gear, detection of vehicle movement, etc.) or in response to a defined user input (e.g., via a user interface provided by the vehicle or on the driver's smartphone or other mobile device communicatively connected to system controller 402), e.g., as discussed above regarding FIG. 2.

At 506 (request data) and 508 (receive data), the session manager 471 may obtain driver history/experience context data 482 regarding the driver, which may include, for example, driver profile data 438, historical navigation data 440, historical mindfulness session data 442, and/or driver calendar data 443, as discussed above. The session manager 471 may obtain the driver history/experience context data 482 from any suitable source, e.g., (a) a mobile device (e.g., smartphone), key fob, or other device associated with the driver, (b) memory 486 of system controller 402, or (c) a remote server 412 via network 414.

At 510, the session manager 471 may select a particular session protocol and/or session theme. The session manager 471 may select the session protocol and/or session theme automatically (e.g., based on the current driving context and/or driver information) or by the driver (e.g., by a speech-based command or via a touchscreen or other user interface provided by the vehicle or the driver's smartphone). The selected session theme may define at least one "welcome" content element 489 (e.g., a welcome audio clip 490).

At 512, the session manager 471 may signal the content manager to access the "welcome" content element 489 for the selected session 130, and instruct the output controller 491 to control the relevant output device(s) 410 to output the "welcome" content element 489 (e.g., signaling the vehicle speakers to play a welcome audio clip 490). The "welcome" content element 489 is output via the relevant output device 410 at 514.

After outputting the "welcome" content element, according to the session protocol the session manager 471 may await a signal from trigger manager 474 to trigger an output of the next content element. At 516, trigger manager 474 may detect a content triggering event, e.g., based on any suitable contextual information as discussed above (e.g., driving context data 480, driver state data 481, etc.), and notify the session manager 471. At 518, the session manager 471 may select at least one content element 489 to output, e.g., based on the session protocol, session theme, the particular content triggering event, or other suitable information.

At 520, the session manager 471 may signal the content manager to access the selected content element(s) 489 (e.g., audio clip, seat massage, and/or air conditioner control), and instruct the output controller 491 to control the relevant output device(s) 410 to output the selected content element(s) 489 to the driver. The selected content element(s) 489 are then output via the relevant output device(s) 410 at 522. After outputting the content element(s) at 522, according to the session protocol the session manager 471 may await another signal from trigger manager 474 to trigger an output of the next content element.

Figure 6A:
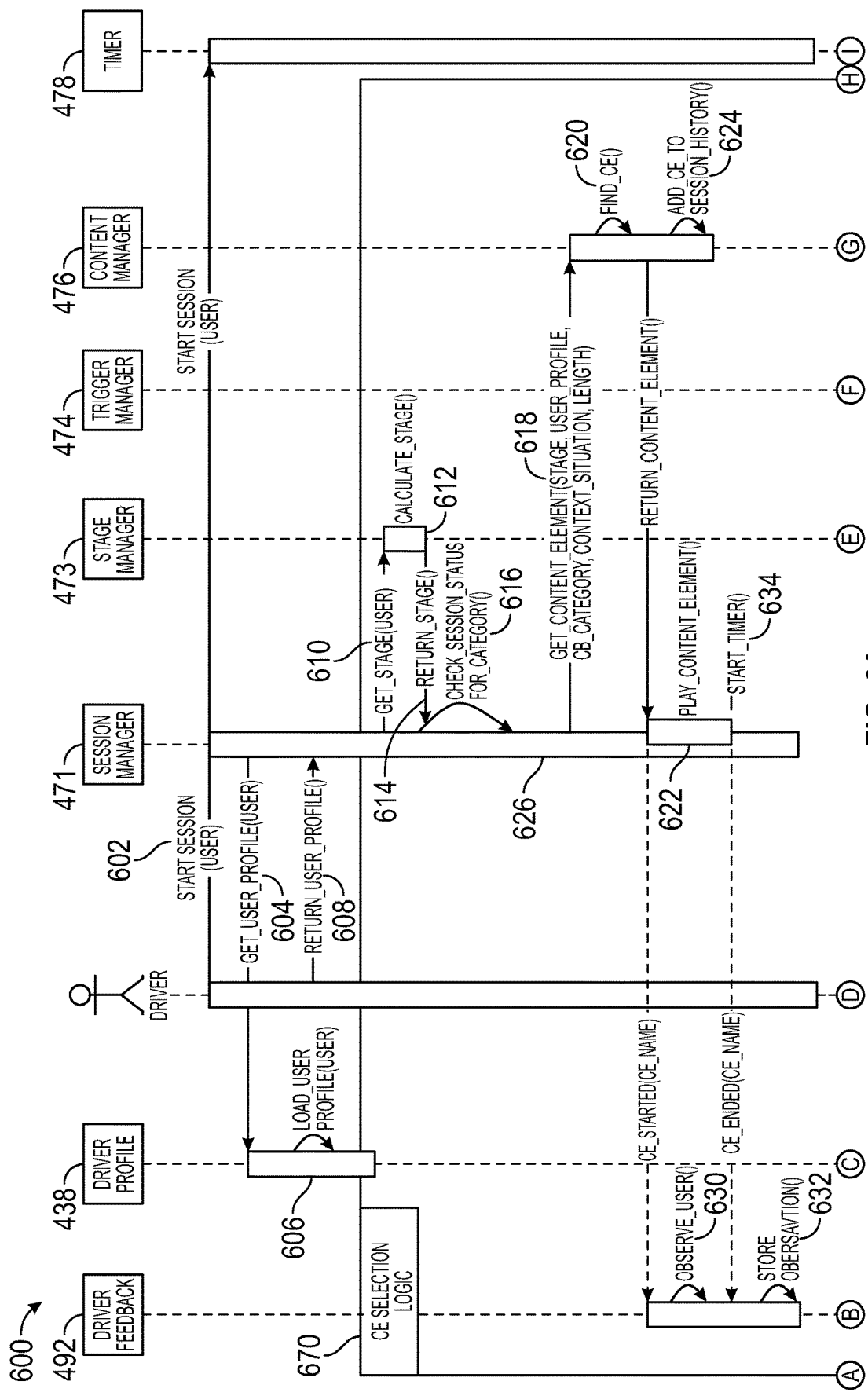
FIGS. 6A-6B show a more detailed version of the mindfulness session flow of FIG. 5, according to one example embodiment.
Figure 6B:
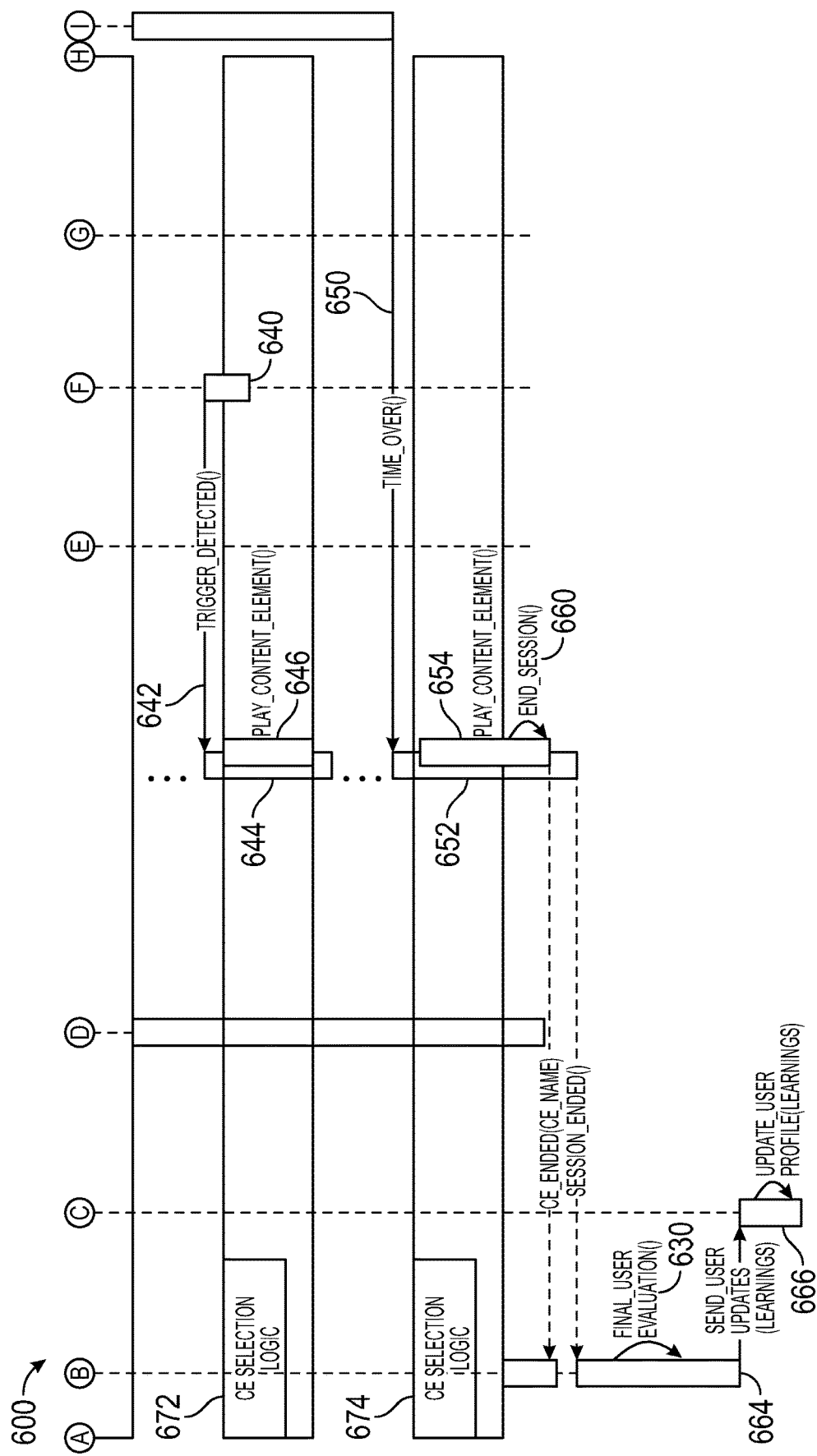

FIGS. 6A-6B shows an example process flow 600 of a driving experience session (mindfulness session), according to one example embodiment. Example process flow 600 is a more detailed view than process flow 500, showing the involvement of additional system components, e.g., stressfulness stage manager 473, content manager 476, a timer 478, etc.

At 602, the session manager 471 may start the driving experience session, e.g., automatically in response to a defined action or in response to a defined user input, e.g., as discussed above. Session manager 471 may signal a timer 478 to start counting. The timer 478 may monitor the duration of the driving experience session, and trigger an end of the session after a defined session duration, as discussed below at step 650. At 604, the session manager 471 may request a driver profile 438 for the driver (and/or other driver history/experience context data 482) from a source storing the driver profile 438, e.g., (a) a mobile device (e.g., smartphone), key fob, or other device associated with the driver, (b) system controller 402, or (c) a remote server 412 via network 414. At 606, the source storing the driver profile 438 may retrieve the driver profile 438, and return the requested driver profile 438 to the session manager 471 at 608.

Example process flow 600 shows selected procedures for selecting and outputting content to the driver, for three stages of the driving experience session: (1) a start-of-session stage 670, (b) a mid-session stage 672, and (c) an end-of-session stage 676. The process flow in each session stage is implemented by respective content selection logic, e.g., executed by session manager 471 and other various components of system controller 402.

Starting with the start-of-session stage 670, at 610 the session manager 471 may request a current stressfulness stage from a stressfulness stage manager 473, which may calculate or determine a current stressfulness stage for the driver at 612, and return the requested stressfulness stage to the session manager 471 at 614. At 616, the session manager 471 may determine a current session status, in this case a start-of-session stage, and identify a content element category (i.e., a group of available content elements) for the start-of-session stage. At 618, the session manager 471 may select one or more particular content element 489 to be output to the driver, based on various input data, including (a) the determined current stressfulness stage, the driver profile 438, the determined content element category, additional contextual information (e.g., driving context data 480 and/or driver state data 481), and/or the length (output duration) of each respective content element 489. The session manager 471 may then notify a content manager 476 of the selected content element(s) 489 to be output. At 620, the content manager 476 may access the selected content element(s) 489, and forward the selected content element(s) 489 to the session manager 471. The content manager 476 may also store a record of the selected content element(s) 489, at 624.

At 626, the session manager 471 may output the selected content element(s) 489, e.g., by instructing an output controller 491 to control one or more output devices 410 to output the selected content element(s) 489 to the driver. While the content element(s) 489 are output, a driver feedback manager 492 may observe the driver's behavior at 630, e.g., using suitable driver monitoring sensors 444, and store the observed driver feedback at 632.

At the end of the content element output, at 634, the session manager 471 may start a timer that may be used for time-based triggering of a next content element output. For example, the session protocol may specify a time-based content triggering event after any 3 minute period without content output (e.g., 3 minutes without the occurrence of a context-based triggering event).

Next, during the mid-session stage 672, the session manager 471 may initiate content output in response to trigging events detected by trigger manager 474. As shown, trigger manager 474 may detect a content triggering event at 640 based on contextual data, e.g., driving context data 480 and/or driver state data 481, received from any local and/or remote data sources. At 644, session manager 471 may select one or more particular content element 489 to be output to the driver, based on various input data, including (a) the type or details of the content triggering event (including the contextual data underlying the triggering event), (b) the current stressfulness stage, and (c) the length (duration) of available content elements 489. At 646, the session manager 471 may output the selected content element(s) 489, e.g., by instructing the output controller 491 to control output device(s) 410 to output the selected content element(s) 489 to the driver.

The trigger manager 474 and session manager 471 may continue to detect context-based triggering events and select and output suitable content elements throughout the duration of the mid-session stage 672. For each content output instance, the driver feedback manager 492 may observe the driver's behavior at 630, e.g., using suitable driver monitoring sensors 444, and store the observed driver feedback.

At the end of the timed session duration, the timer 478 may notify the session manager 471, as indicated at 650, which may initiate the end-of-session stage 674. At 652, the session manager 471 may select suitable end-of-session content element(s) 489, and output the selected content element(s) 489 at 654, e.g., by instructing the output controller 491 to control output device(s) 410 to output the selected content element(s) 489 to the driver. At the end of the session, indicated at 660, the driver feedback manager 492 may evaluate the driver's behavioral feedback throughout the session at 664, and update the driver's mindfulness historical data 442 accordingly.

In some embodiments, each instance of a driving experience session may follow a defined time-based protocol including rules for determining the timing and types of content output during the session.

Figure 7:
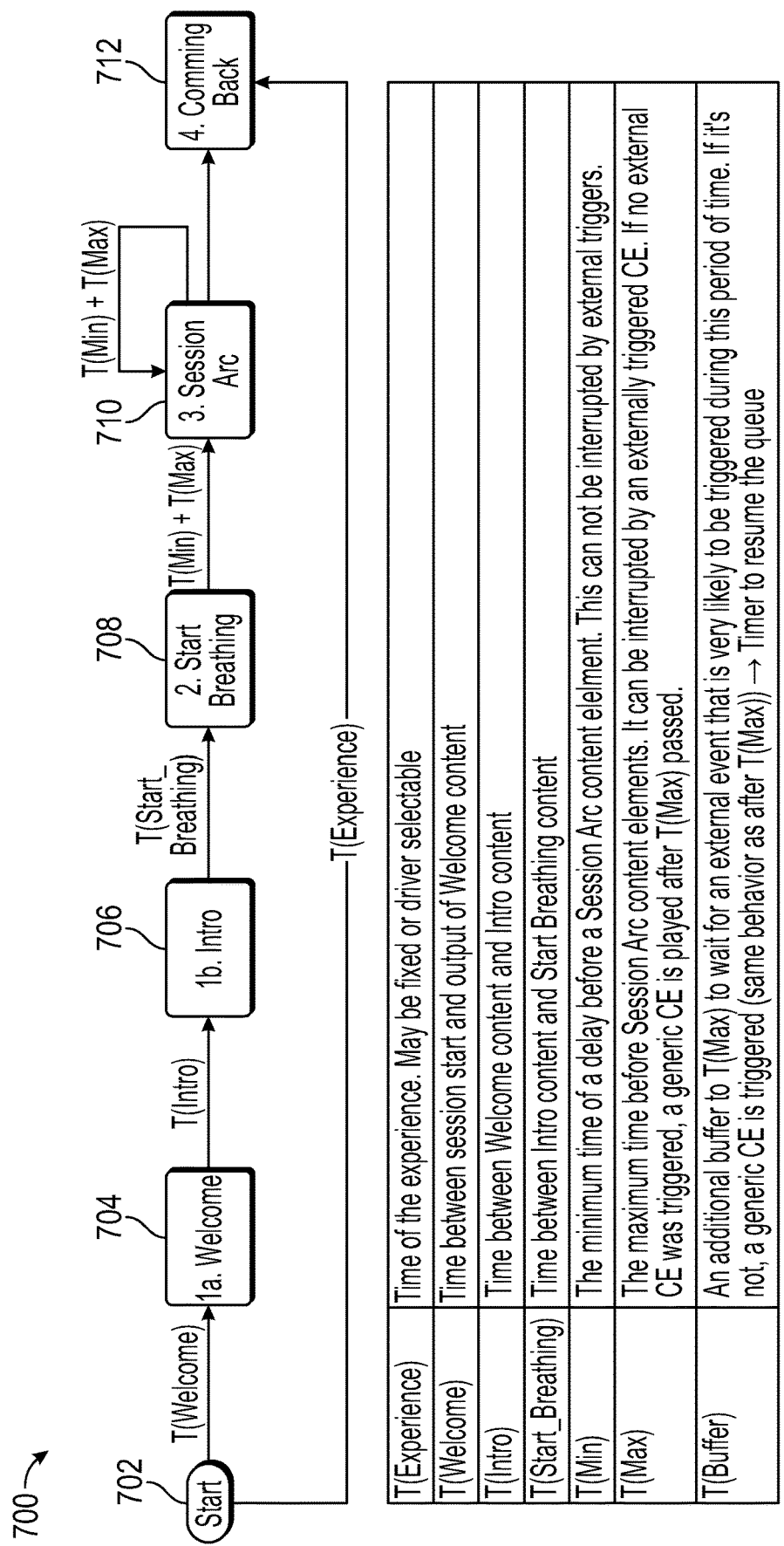
FIG. 7 illustrates a time-based progression of an example mindfulness session flow, illustrating the use of a time-based content trigger in the absence of a detected driving context-based trigger, according to one example embodiment.

FIG. 7 illustrates an example time-based session protocol 700 executed by session manager 471 to implement a driving experience session, according to one example embodiment. The session protocol starts at 702, e.g., automatically or in response to a defined user input, e.g., as discussed above at step 504 or 602. After a defined time period, T(Welcome), at 704 session manager 471 selects and outputs a "Welcome" content element (or elements) to the driver. The "Welcome" content element(s) may be designed to welcome the driver to the driving experience session.

After completion of the "Welcome" content element(s), followed by a next time period, T(Intro), at 706 session manager 471 selects and outputs an "Intro" content element (or elements) to the driver. The "Intro" content element(s) may introduce the driver to the theme, purpose, and/or details of the driving experience session.

After completion of the "Intro" content element(s), followed by a next time period, T(Start_Breathing), at 708 session manager 471 selects and outputs a "Start Breathing" content element (or elements) to the driver. The "Start Breathing" content element(s) may be a first content element, e.g., audio clip, for a relaxation session for the driver.

After completion of the "Start Breaking" content element(s), the session protocol enters a trigger-based content phase, in which a series of "Session Arc" content outputs are initiated based on (a) detected context-based triggering events (also referred to as external triggers) and (b) time-based triggers. In this example, the protocol defines a time period T(Min) representing a minimum time delay after completion of each content element, during which context-based triggering is disabled. The protocol also defines a time period T(Max) representing a maximum time between content element that triggers; thus, after completion of a particular content element, if T(Max) is reached without the occurrence of any context-based triggering event, session manager 471 outputs a predefined (e.g., generic) content element.

The protocol may also define a buffer period T(Buffer) representing an addition buffer that can be added to T(Max) (thereby delaying the predefined/generic content element output) when session manager 471 identifies a "predictive trigger" during the period T(Max). A predictive trigger is a prediction that a context-based triggering event will occur during the T(Buffer) period, e.g., based on traffic light timing information or other data available to session manager 471 (e.g., by determining a percentage likelihood of an event that exceeds a defined threshold value).

Returning to session protocol 700, a "Coming Back" content element may be output at the end of the session, e.g., at the end of a predefined duration of the session, or in response to the system detecting the driver is reaching her destination.

Figure 8A:
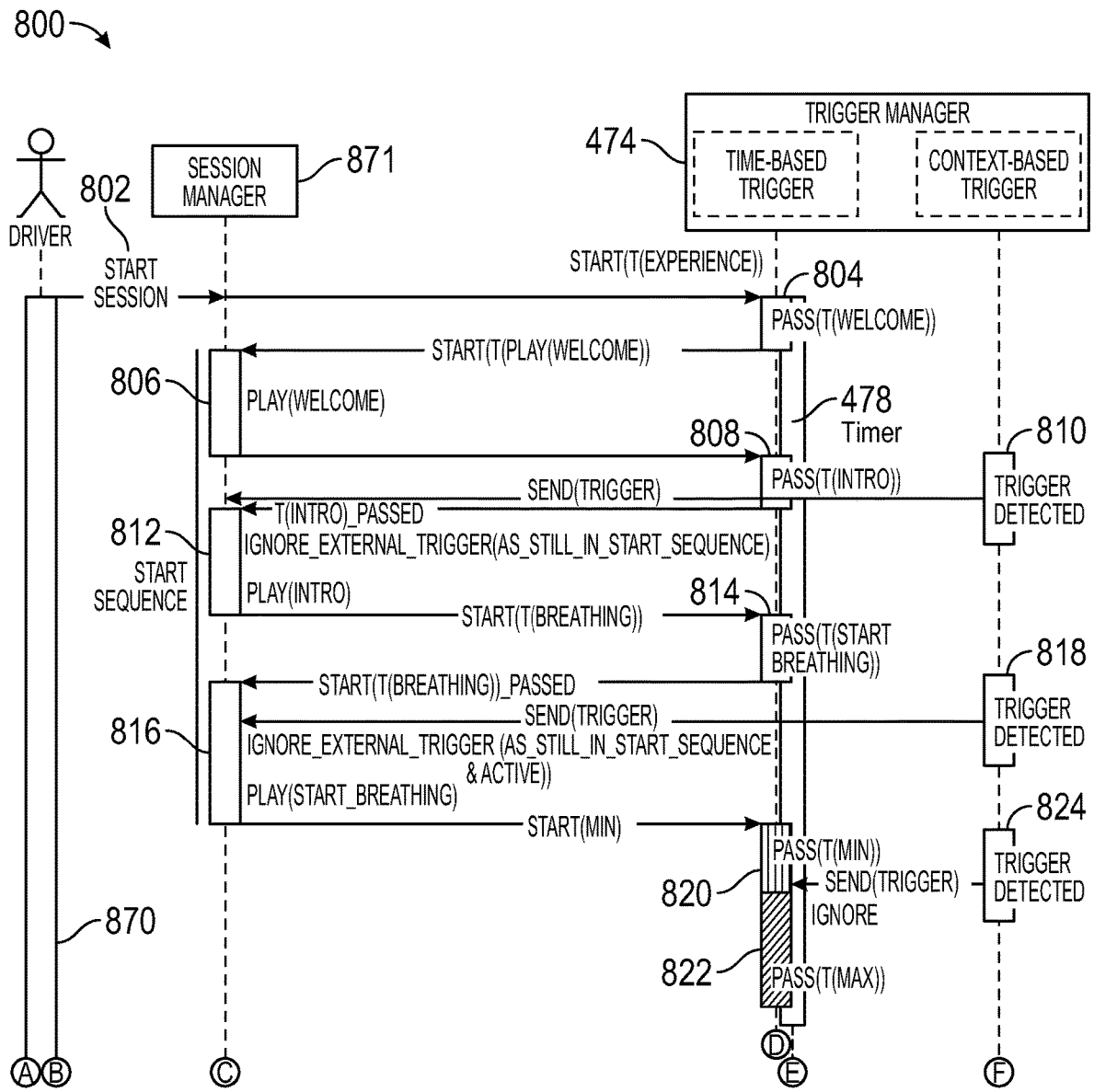
FIGS. 8A-8B illustrate an example mindfulness session flow illustrating an implementation of the context-based and time-based content triggers introduced in FIG. 7, according to one example embodiment.
Figure 8B:
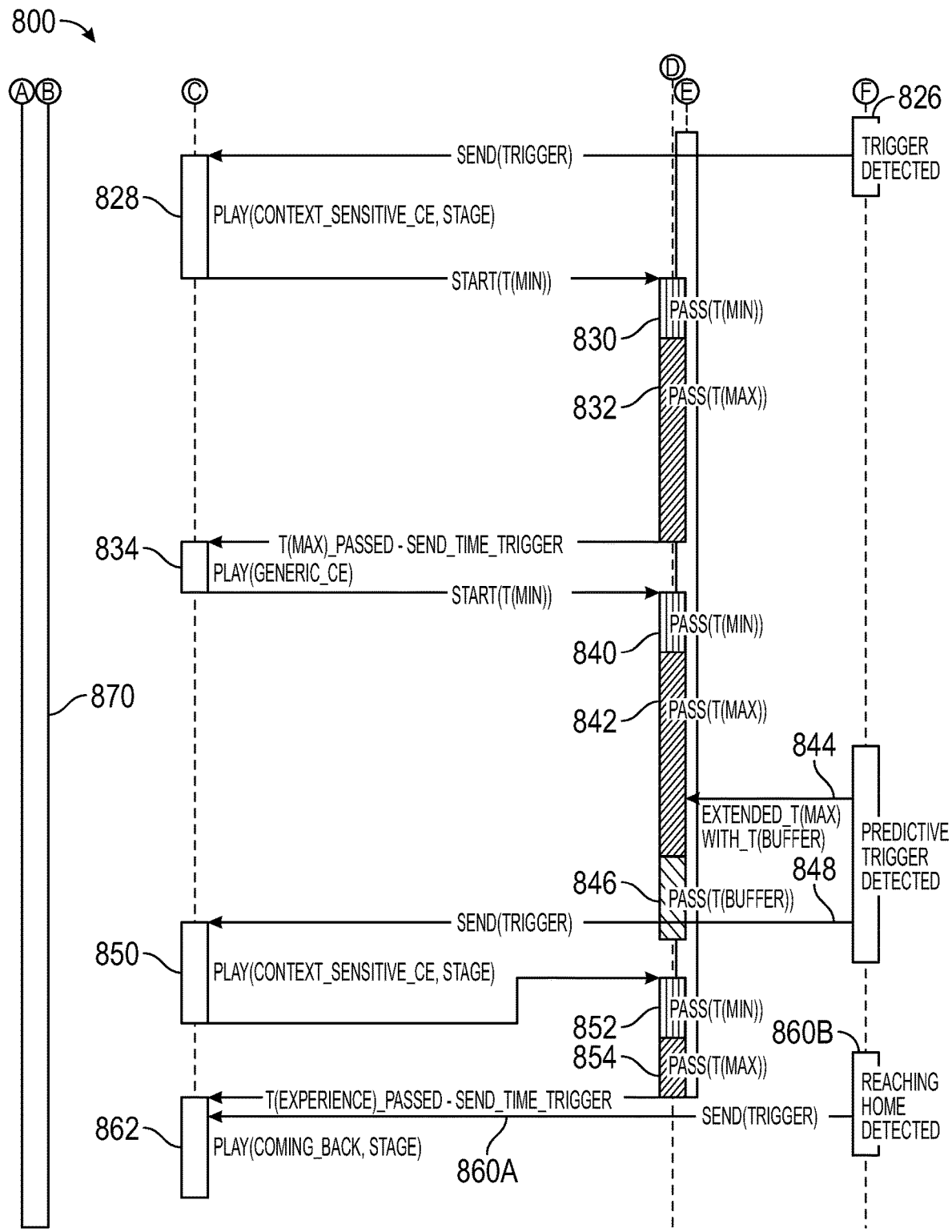

FIGS. 8A-8B illustrate an example process flow 800 of a driving experience session (mindfulness session) implementing the context-based and time-based content triggering of the session protocol shown in FIG. 7, according to one example embodiment. At 802, the driving experience session starts, and session manager 471 starts a session timer 478. After completion of a time period T(Welcome), indicated at 804, session manager 471 outputs Welcome content element(s). After completion of the Welcome content, session manager 471 starts a timer T(Intro) at 808. If a context-based triggering event (external trigger) is detected before the end of T(Intro), as indicated at 810, the external trigger is ignored, as discussed above regarding FIG. 7.

At the completion of T(Intro), session manager 471 outputs Intro content element(s) at 812. After completion of the Intro content, session manager 471 starts a timer T(Start_Breathing) at 814. At the end of timer T(Start_Breathing), session manager 471 outputs Start_Breathing output element(s) at 816. If an external trigger is detected during the output of Start_Breathing output element(s), as indicated at 818, the external trigger is ignored.

At the completion of the Start_Breathing output element(s), session manager 471 starts a timer T(Min) followed by T(Max), indicated at 820, 822. If an external trigger is detected during T(Min), as indicated at 824, the external trigger is ignored. However, if an external trigger is detected during T(Max), as indicated at 826, the external trigger is signaled to session manager 471, which selects and outputs Context-Sensitive content element(s), e.g., based on driving context data 481 and a current stressfulness stage, at 828.

At the completion of the Context-Sensitive content element(s) at 828, session manager 471 again starts a timer T(Min) followed by T(Max), indicated at 830, 832. If T(Max) 832 is reached without detection of an external trigger, as shown in FIG. 8, a time-based trigger is signaled to session manager 471, which selects and outputs Generic content element(s) at 834.

At the completion of the Generic content element(s) at 834, session manager 471 again starts a timer T(Min)

followed by T(Max), indicated at 840, 842. If a "predictive trigger" is detected during T(Max) 832, as indicated at 844, session manager 471 may extend T(Max) by a buffer period T(Buffer), indicated at 846. Then, if the trigger manager 474 detects the predicted context-based trigger during the buffer period T(Buffer), as indicated at 848, the trigger manager 474 signals the session manager 471, which then selects and outputs Context-Sensitive content element(s), e.g., based on driving context data 481 and a current stressfulness stage, at 850.

At the completion of the Context-Sensitive content element(s) at 850, session manager 471 again starts a timer T(Min) followed by T(Max), indicated at 852, 854. In this example, a session ending event occurs during T(Max). For example, as indicated at 860A, a defined session duration may expire, triggering session manager 471 to select and output "ComingBack" content element(s) as indicated at 862. Alternatively, as indicated at 860B, a context-based trigger may trigger the end of the session. For example, trigger manager 474 may detect, based on GPS data, that the driver will arrive at the determined destination at a defined time, e.g., in 2 minutes from the current time.

In addition to the process discussed above, as indicated at 470 the session may be terminated at any time by the driver, e.g., upon receiving a defined user input from the driver.

As discussed above, in some embodiments system controller 402 may use traffic light data 464, e.g., obtained from a remote server 412. Traffic light data is also referred to herein as TLO (traffic light online) data. In some implementations, the time the driver is waiting on a traffic light to turn green may be a good time to output particular types of content, e.g., engaging mindfulness exercises, such as deep breathing exercises or even small physical exercises, for example. In some embodiments, the TLO data source (e.g., remote server) communicates the TLO information to system controller 402 shortly before (e.g., a couple seconds before) the vehicle reaches the traffic light. The communicated TLO data may include the currently active traffic light status (e.g., light color/arrow) and the next predicted status.

Figure 9:
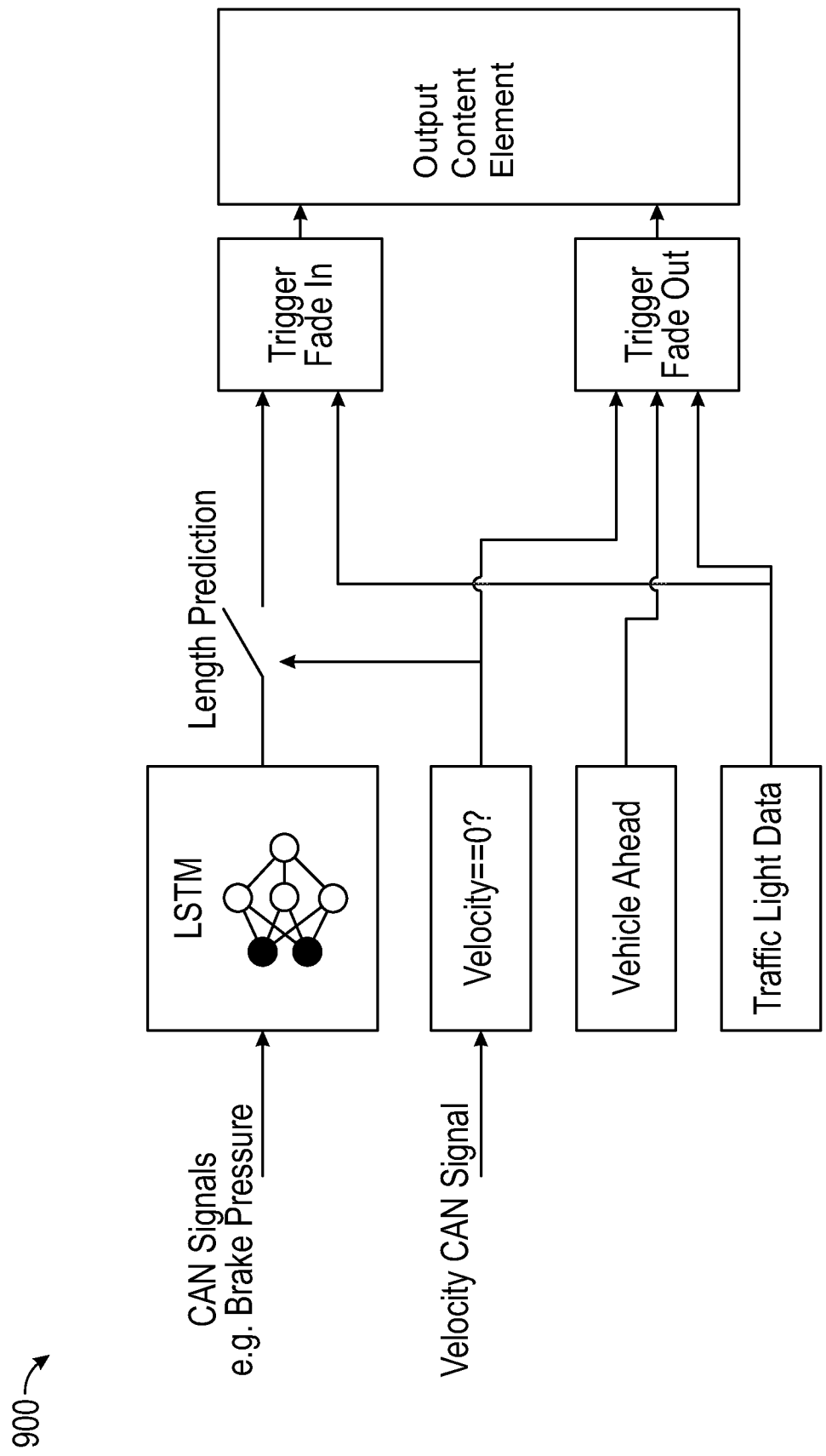
FIG. 9 illustrates an example stop length prediction system, according to one example embodiment.

FIG. 9 illustrates an example stop length prediction algorithm 900, which may be implemented by stop length predictor 475, according to one example embodiment. Algorithm 900 analyzes CAN signals that monitor the driver's behavior, for example, brake pressure, accelerator pedal position, steering wheel angle, and vehicle velocity. When the vehicle stops (or during a period prior to the stop) the algorithm feeds the CAN signals into a time-series prediction model (for example an LSTM, categorical clustering, or other machine learning model), which is trained to predict the length of the vehicle stop. The algorithm may be configured to derive the driver's intention regarding the stop with high accuracy, based on the driving behavior data (CAN signals) when slowing down for the stop, which data statistically indicates the driver's intent.

As shown in algorithm 900, when the vehicle comes to a stop (or is about to come to a stop) the LSTM predicts the length of the stop using CAN signal data from a defined time period (e.g., 2.5 seconds or 5 seconds) prior to the vehicle stop. If the stop length predictor 475 predicts a long stop (e.g., above a defined threshold duration), stop length predictor 475 may trigger an output of one or more selected content element(s), e.g., by signaling session manager 471. The content may be output until completion of the selected content element(s), or until trigger manager 474 system detects one of the following triggering events that terminates the content output:

(a) the vehicle brake has been released or the vehicle has started accelerating,
(b) the vehicle ahead has started to move, or
(c) the traffic light is predicted to turn green within a defined time, e.g., based on traffic light data 464.

It should be understood that algorithm 900 is an example only, and stop length predictor 475 may utilize any other rules or algorithms for predicting a vehicle stop length.

Figure 10:
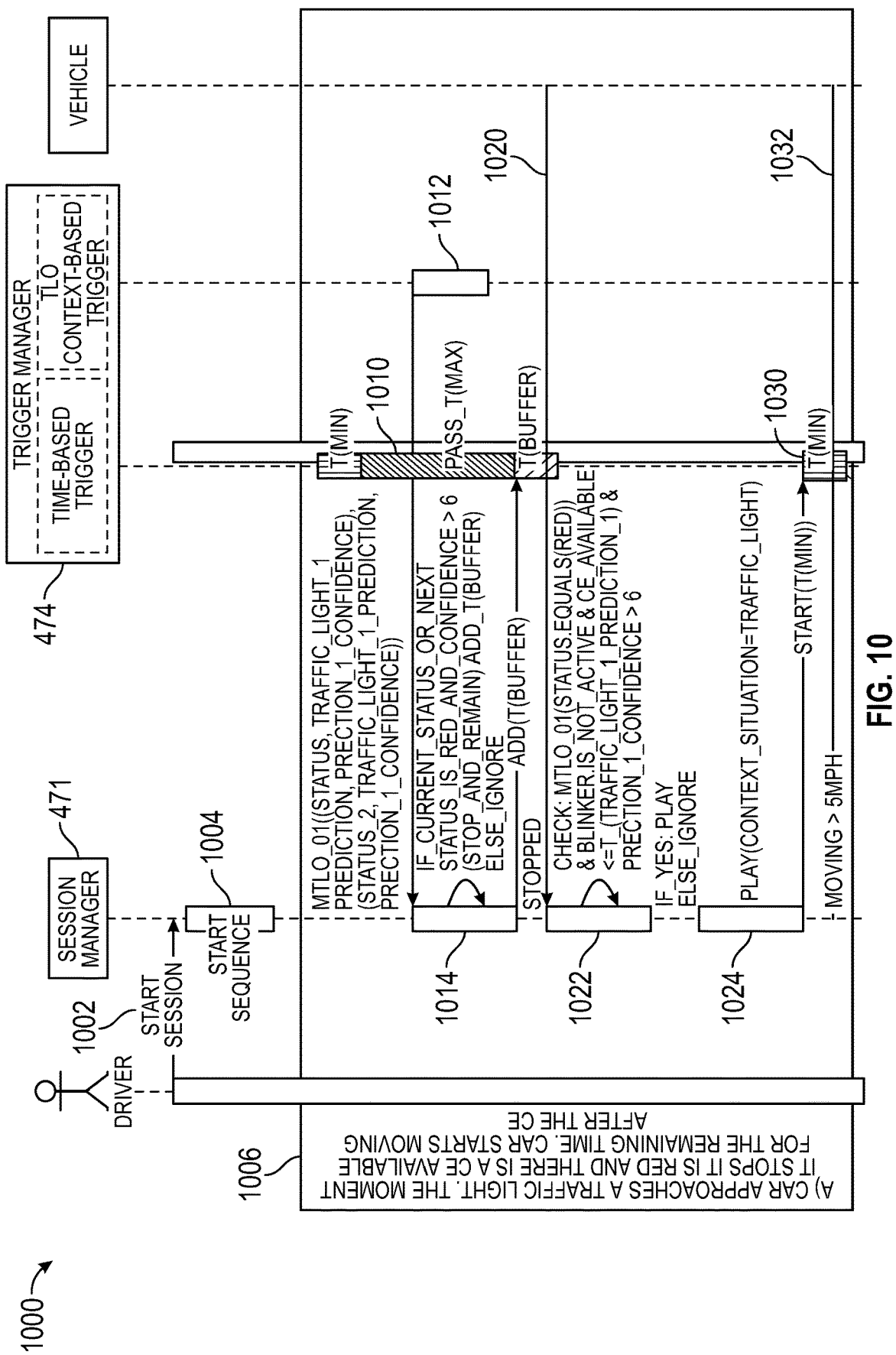
FIG. 10 illustrates an example protocol for content selection decisioning when encountering a red light during a mindfulness session, according to one example embodiment.

FIG. 10 illustrates an example process flow 1000 of a portion of a driving experience session (mindfulness session) when the driver encounters a red light, according to one example embodiment. In this example embodiment, trigger manager 474 implements a TLO protocol including the following rules:

1. A TLO content element is only triggered when the car reached the Traffic Light and has stopped.
2. Only content elements are selected that are shorter than the Traffic light prediction time. If there are no such content elements, the content trigger is ignored.
3. The TLO signals can manipulate the time-based trigger and add a T(Buffer) to the T(Max) period (if the traffic light will be reached within this time).
4. A TLO content element is only triggered when there is no active turn signal (blinker, directional, etc.) set, such that the system assumes the driver is continuing straight, and thus not mentally burdened by a turning maneuver.

Turning to process flow 1000, the session starts at 1002 and proceeds through a starting sequence at 1004, and enters a mid-session phase 1006. During a particular T(Max) period indicated at 1010, trigger manager 474 detects the vehicle is approaching a traffic light, and obtains TLO data for the traffic light from a remote server 412, indicated at 1012, and forwards the TLO data to the session manager 471. The session manager 471 analyzes the TLO data at 1014. In this example, if session manager 471 both (a) determines the current or next status of the traffic light is "red light" (e.g., with a confidence measure that exceeds a corresponding threshold confidence value) and (b) determines a stopping confidence measure that exceeds a corresponding threshold confidence value, the session manager 471 adds a buffer time T(Buffer) to the T(Max) time, to prevent the time-based triggering of a generic content element in order to allow a TLO-based content triggering. The stopping confidence measure may represent a statistical likelihood or other predictive measure that the vehicle will (i) stop at the red light before the completion of a buffer time T(Buffer) that can be appended to T(Max) and (ii) remain at the red light for a defined minimum time period.

In the illustrated example, the session manager 471 determines the above in the positive, thus adding the buffer time T(Buffer), and the vehicle stops at the red light at 1020. When the vehicle stops, the session manager 471 determines at 1022 whether to output a traffic stop-specific content element. In this embodiment, the session manager 471 determines whether (a) the light is red, (b) the vehicle turn signal is inactive, and (c) at least one content element having a duration less than a predicted vehicle stopping time (e.g., determined according to concepts discussed above regarding FIG. 9) is available, all with a statistical confidence measure that exceeds a threshold value. If session manager 471 determines the above in the positive, session manager 471 may select and output a traffic stop-specific content element at 1024.

In this example, the traffic stop-specific content element completes while the vehicle remains stopped, and the protocol returns to a T(Min) timer as indicated at 1030. As shown, the vehicle then begins moving (above 5 mph) at 1032. In some embodiments, if the vehicle then begins moving (e.g., above 5 mph or other defined threshold speed) during the output of the traffic stop-specific content element, the content output is interrupted.

In addition to the various types of content trigger discussed above, some embodiments provide weather-based content triggering, e.g., rain-based content triggering. The system controller 402 may determine the weather conditions in multiple different ways. For example, the system controller 402 may send API calls to an online weather service provider 412 to obtain the weather data for the vehicle's current GPS position. Or, system controller 402 may use on-board vehicle sensors, e.g., to detect rain or other weather conditions. In one embodiment, system controller 402 may use a combination of a rain sensor and a signal indicating the windshield wiper status, combined with a defined time delay (e.g., to avoid a false positive detection when the driver is cleaning the windshield) to detect a rain condition.

In one embodiment, a rain-based content triggering protocol may include the following rules:

1. System controller 402 subscribes to 2 MQTT topics: Rain Sensor and Wiper status, each of which generates and sends a signal to session manager 471 upon each rain or wiper status change.
2. The rain sensor sends a value between 0 to 100. The wiper sends an On/Off signal.
3. The session manager 471 caches the received signal values.
4. When the rain sensor sends a value above 50 and the Wiper sends and On signal, session manager 471 starts a timer for 10 seconds.
5. After 10 seconds to session manager 471 checks the cached values of the rain sensor and the wiper status.
6. If the wiper is ON after 10 seconds and the rain sensor is above 50, to session manager 471 outputs a wiper-specific content element.
7. If the rain sensor value drops below 50 OR the wiper turns off, session manager 471 does not output a content element.
8. When the 10 second timer runs out the protocol timer must be in a T(Max) period to receive and process the wiper-based content trigger.
9. If the timer is in a T(Min) period or another content element is being outputted, the trigger is ignored.
10. If the trigger is ignored, session manager 471 waits to receive another rain sensor or wiper status value, upon which (depending on the received values) the session manager 471 will restart the timer for 10 seconds and the cycle restarts.

The invention claimed is:

1. A method for generating a context-dependent experience for a driver of a vehicle, the method comprising:
   receiving, at a system controller, driving context data regarding a driving situation;
   determining, by the system controller, a predicted stop time of the vehicle based on the received driving context data;
   comparing, by the system controller, the predicted stop time of the vehicle to at least one threshold time value;
   selecting an audio clip, by the system controller, based at least on the comparison of the predicted stop time of the vehicle to the at least one threshold time value; and
   controlling, by the system controller, at least one speaker to play the selected audio clip.

2. The method of claim 1, wherein receiving driving context data at the system controller comprises receiving vehicle operation data related to a current operation of the vehicle, the vehicle operation data comprising at least one of (a) sensor-based vehicle data generated by at least one sensor monitoring at least one operational aspect of the vehicle, or (b) vehicle location data generated by a Global Positioning System (GPS) system.

3. The method of claim 1, wherein receiving driving context data at the system controller comprises:
   receiving vehicle operation data related to a current operation of the vehicle; and
   receiving environmental data regarding an environment external to the vehicle.

4. The method of claim 3, wherein receiving environmental data regarding an environment external to the vehicle comprises receiving environmental data from a remote server via a wireless network.

5. The method of claim 4, wherein:
   the received vehicle operation data comprises Global Positioning System (GPS) data indicating a location of the vehicle; and
   the received environmental data includes location-specific environment data associated with the location of the vehicle or a defined related location, wherein the location-specific environment data includes at least one of (a) weather data, (b) traffic data, (c) traffic light data, or (d) road classification data.

6. The method of claim 1, wherein determining a predicted stop time based on the received driving context data comprises:
   receiving traffic data or traffic light data from a remote server via wireless communications; and
   determining a predicted stop time based on the received traffic data or traffic light data.

7. The method of claim 1, comprising:
   determining, by the system controller, a stressfulness stage for the driver; and
   selecting, by the system controller, the audio clip based at least on the determined stressfulness stage.

8. The method of claim 7, wherein:
   determining the stressfulness stage for the driver comprises:
   receiving vehicle operation data related to a current operation of the vehicle; and
   receiving driver data regarding a mental state of the driver;
   determining a stressfulness stage for the driver based on the received vehicle operation data and the received driver data regarding the mental state of the driver.

9. The method of claim 8, wherein receiving driver data comprises (a) receiving sensor-based driver data generated by at least one sensor configured to monitor the driver, or (b) accessing a driver profile including driver-specific data.

10. The method of claim 1, comprising:
   the system controller having access to a set of audio clips having different lengths; and the system controller selecting, from the set of audio clips, an audio clip having a length consistent with the predicted stop time of the vehicle.

11. A system for generating a context-dependent experience for a driver of a vehicle, the system comprising:
   at least one driving context data source provided in the vehicle and configured to generate or access driving context data regarding a driving situation;
   at least one speaker; and
   a system controller comprising a processor configured to execute computer-readable instructions stored in non-transitory media to:
      receive the driving context data from the at least one driving context data source;
      determine a predicted stop time of the vehicle based on the received driving context data;
      compare the predicted stop time of the vehicle to at least one threshold time value;
      select an audio clip, by the system controller, based at least on the comparison of the predicted stop time of the vehicle to at least one threshold time value; and
      control the least one speaker to play the selected audio clip.

12. The system of claim 11, wherein the at least one driving context data source provided in the vehicle and configured to generate or access driving context data regarding a driving situation comprises at least one of (a) at least one sensor configured to generate sensor data regarding at least one operational aspect of the vehicle or (b) a Global Positioning System (GPS) system configured to generate vehicle location data.

13. The system of claim 11, wherein the at least one driving context data source provided in the vehicle and configured to generate or access driving context data regarding a driving situation comprises:
   a vehicle operation data source configured to generate vehicle operation data related to a current operation of the vehicle; and
   an environmental data source configured to generate or obtain environmental data regarding an environment external to the vehicle.

14. The system of claim 13, wherein the environmental data source comprises a wireless communications interface provided in the vehicle and configured to receive environmental data from a remote server via wireless communications.

15. The system of claim 14, wherein:
   the vehicle operation data generated by the vehicle operation data source comprises Global Positioning System (GPS) data indicating a location of the vehicle; and
   the environmental data received from the remote server includes comprises location-specific environment data associated with the location of the vehicle or a defined related location, wherein the location-specific environment data includes at least one of (a) weather data, (b) traffic data, (c) traffic light data, or (d) road classification data.

16. The system of claim 11, wherein the system controller is configured to:
   determine a stressfulness stage for the driver; and
   select the audio clip based at least on the determined stressfulness stage.

17. The system of claim 16, wherein the system controller is configured to determine the stressfulness stage for the driver by a stage analysis process including:
   receiving vehicle operation data related to a current operation of the vehicle; and
   receiving driver data regarding a mental state of the driver;
   determining a stressfulness stage for the driver based on the received vehicle operation data and the received driver data regarding the mental state of the driver.

18. The system of claim 11, wherein:
   the system controller having access to a set of audio clips having different lengths; and
   the system controller is configured to select, from the set of audio clips, an audio clip having a length consistent with the predicted stop time of the vehicle.

19. A system for generating a context-dependent experience for a driver of a vehicle, the system comprising:
   at least one driving context data source provided in the vehicle and configured to generate or access driving context data regarding a driving situation, the driving context data including navigation data indicating at least a current location of the vehicle;
   an output device configured to output human-perceivable content; and
   a system controller comprising a processor configured to execute computer-readable instructions stored in non-transitory media to:
      receive the driving context data including the navigation data from the at least one driving context data source;
      determine a navigation route of the vehicle based at least on the received navigation data;
      select a human-perceivable content element to output to the driver, from the set of human-perceivable content elements, based at least on the determined navigation route of the vehicle; and
      control the output device to output the selected human-perceivable content element to the driver.

20. The system of claim 19, wherein:
   the navigation data includes historical driver navigation data for the driver; and
   the system controller is configured to determine the navigation route of the vehicle based at least on the current location of the vehicle and the historical driver navigation data for the driver.

21. The system of claim 20, wherein the system controller is configured to:
   determine a predicted stop time of the vehicle based at least on the determined navigation route of the vehicle;
   selecting the set of human-perceivable content elements, from the larger set of human-perceivable content elements, based at least on the predicted stop time of the vehicle.

22. The system of claim 21, wherein:
   the driving context data includes traffic data or traffic light data; and
   the system controller is configured to determine the predicted stop time based at least on the determined navigation route of the vehicle and the traffic data or traffic light data.

23. The system of claim 19, wherein the system controller configured to determine the navigation route of the vehicle comprises the system controller configured to determine a predicted navigation route of the vehicle.

* * * * *

UNITED STATES PATENT AND TRADEMARK OFFICE
CERTIFICATE OF CORRECTION

PATENT NO. : 11,691,636 B2  
APPLICATION NO. : 17/141490  
DATED : July 4, 2023  
INVENTOR(S) : Morten Troestrup Winther et al.

Page 1 of 1

It is certified that error appears in the above-identified patent and that said Letters Patent is hereby corrected as shown below:

On the Title Page

Item (73) Assignee:  
"AUDI AG, Ingolstadt (DE)"  
Change to:  
"AUDI AG, Ingolstadt (DE)  
VOLKSWAGEN AKTIENGESELLSCHAFT, Wolfsburg (DE)  
DR. ING. H.C.F. PORSCHE AKTIENGESELLSCHAFT, Stuttgart (DE)"

Signed and Sealed this  
Second Day of April, 2024

Katherine Kelly Vidal  
*Director of the United States Patent and Trademark Office*